United States Patent
Sharma et al.

(10) Patent No.: US 11,689,977 B2
(45) Date of Patent: Jun. 27, 2023

(54) METHOD AND SYSTEM TO HANDLE HANDOVER PROCEDURE IN MULTI TRP SYSTEM

(71) Applicant: Samsung Electronics Co., Ltd., Suwon-si (KR)

(72) Inventors: Neha Sharma, Bangalore (IN); Vikalp Mandawaria, Bangalore (IN); Anshuman Nigam, Bangalore (IN); Fasil Abdul Latheef, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/301,966

(22) Filed: Apr. 20, 2021

(65) Prior Publication Data

US 2021/0329515 A1    Oct. 21, 2021

(30) Foreign Application Priority Data

Apr. 20, 2020 (IN) .............................. 202041016939
Apr. 13, 2021 (IN) .............................. 202041016939

(51) Int. Cl.
*H04W 36/00* (2009.01)
*H04W 80/02* (2009.01)
*H04W 36/08* (2009.01)

(52) U.S. Cl.
CPC . *H04W 36/00837* (2018.08); *H04W 36/0058* (2018.08); *H04W 36/0061* (2013.01); *H04W 36/08* (2013.01); *H04W 80/02* (2013.01)

(58) Field of Classification Search
CPC ............. H04W 24/10; H04W 36/0085; H04W 36/0094; H04W 36/30
See application file for complete search history.

(56) References Cited

U.S. PATENT DOCUMENTS 9,860,810 B2    1/2018  Rahman et al.
2019/0313314 A1  10/2019  Yang
(Continued)

FOREIGN PATENT DOCUMENTS

CN         107734572 B    2/2018
WO    WO-2018028412 A1 *  2/2018   ............ H04W 36/00
(Continued)

OTHER PUBLICATIONS

Examination report dated Feb. 8, 2022, in connection with Indian Application No. 202041016939, 6 pages.
(Continued)

*Primary Examiner* — Nam T Huynh

(57) ABSTRACT

The present disclosure relates to wireless communication system and more particularly relates to the design of handover procedures for multi TRP system for a mobile station and other devices. Multi TRP per cell or cell less or cell free architecture removes the boundaries of the cell. A method of handover for a UE in a multi TRP system comprising selecting a set of candidate TRPs for the UE for a handover operation and receiving a measurement report from the UE. The source node determines a trigger for handover of the UE in response to the measurement report and compares a configuration of the source node with a configuration of a candidate TRP from the set of candidate TRPs. The source node triggers a handover command to perform a handover operation for the UE with at least one candidate TRP based on a result of the comparison.

18 Claims, 14 Drawing Sheets

(56) References Cited

U.S. PATENT DOCUMENTS

2020/0007282 A1   1/2020   Yoon et al.
2021/0120458 A1*  4/2021   Koskela .......... H04W 36/00837

FOREIGN PATENT DOCUMENTS

WO   WO-2018057076 A1 *  3/2018   ............ H04W 24/10
WO      2019070174 A1    4/2019
WO      2019156905 A1    8/2019

OTHER PUBLICATIONS

International Search Report and Written Opinion of the International Searching Authority dated Jul. 27, 2021 in connection with International Application No. PCT/KR2021/004947, 7 pages.

\* cited by examiner

METHOD AND SYSTEM TO HANDLE HANDOVER PROCEDURE IN MULTI TRP SYSTEM

CROSS REFERENCE TO RELATED APPLICATIONS

This application is based on and claims priority under 35 U.S.C. § 119 to Indian Provisional Patent Application No. 202041016939 which was filed on Apr. 20, 2020, and Indian Complete Patent Application No. 202041016939 which was filed on Apr. 13, 2021, the disclosures of which are herein incorporated by reference in their entirety.

BACKGROUND

1. Field

The present disclosure relates to wireless communication system and more particularly relates to the design of handover procedures for multi transmission/reception point (TRP) system for a mobile station and other devices.

2. Description of the Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In recent years several broadband wireless technologies have been developed to meet the growing number of broadband subscribers for providing better applications and services. Second generation wireless communication system has been developed to provide voice services while ensuring the mobility of users. Third-generation wireless communication system supports not only the voice service but also data service. In recent years, fourth wireless communication system has been developed to provide high-speed data service. However, currently, the fourth-generation wireless communication system suffers from a lack of resources to meet the growing demand for high-speed data services. This problem is solved by the deployment of fifth generation wireless communication system to meet the ever-growing demand for high-speed data services. Furthermore, the fifth-generation wireless communication system provides ultra-reliability and supports low latency applications.

The fifth generation wireless communication system as illustratively depicted in FIG. 1A is implemented not only in lower frequency bands but also in higher frequency (mm-Wave) bands, e.g., 10 GHz to 100 GHz bands, to accomplish higher data rates. Further, various techniques are being considered in the design of fifth generation wireless communication system in order to mitigate propagation loss of the radio waves, increase transmission distance, beamforming, massive Multiple-Input Multiple-Output (MIMO), Full Dimensional MIMO (FD-MIMO), array antenna, analog beamforming, and large scale antenna and the like. In addition, the fifth generation wireless communication system is required to address different use cases having different requirements in terms of data rate, latency, reliability, mobility, etc. It is further required that the design of the air-interface of the fifth generation wireless communication system may be flexible enough to serve the UEs having different capabilities depending on the use case and market segment for which the UE cater service to the end customer. There are few examples of the use cases that the fifth generation wireless communication system wireless system is required to address, for example, enhanced Mobile Broadband (eMBB), massive Machine Type Communication (m-MTC), ultra-reliable low latency communication (URLL), etc. In particular, the eMBB requirements are like tens of Gbps data rate, low latency, high mobility, etc. These eMBB requirements address the market segment representing the conventional wireless broadband subscribers that needs seamless internet connectivity. The m-MTC requirements are like very high connection density, infrequent data transmission, very long battery life, low mobility, etc. These MTC requirements address the market segment representing the Internet of Things (IoT)/Internet of Everything (IoE) envisioning connectivity to billions of devices. The URLLC requirements are like very low latency, very high reliability, variable mobility, etc. These URLLC requirements address the market segment representing the industrial automation application, vehicle-to-vehicle/vehicle-to-infrastructure communication foreseen as one of the enablers for autonomous cars.

For the next generation of wireless communication systems i.e., 6G various technologies have been under consideration, for example, Visible Light Communication (VLC), Terahertz band (THz) i.e., frequencies from 100 GHz to 3 THz, Infrared wave and Ultraviolet wave, etc. Among all these technologies the THz band is envisioned as a potential technology for a diverse range of applications, which exist within the nano, micro as well as macro scales. The various features of THz band may provide terabits per second (Tbps) data rates, reliable transmission, and minimal latency.

Frequencies from 100 GHz to 3 THz are promising bands for the next generation of wireless communication systems because of the wide range of the unused and unexplored spectrum. As per the literature available for THz band communication system these frequencies also offer the potential for revolutionary applications in the realm of devices, circuits, software, signal processing, and systems. The ultra-high data rates facilitated by mmWave and THz wireless local area and cellular networks enable super-fast download speeds for computer communication, autonomous vehicles, robotic controls, information shower, high-definition holographic gaming, entertainment, video conferencing, and high-speed wireless data distribution in data centers. In addition to the extremely high data rates, there are promising applications for future mmWave and THz systems that are likely to evolve in 6G networks, and beyond.

As per the literature available for THz band communication system, Terahertz band has specific characteristics like high path loss which includes the spreading as well as absorption loss. The terahertz band may be absorbed by raindrops, ice and grass and any medium containing water molecule. The link is more sensitive than the mmWave system so the link is more fragile. Therefore, there are high chances that the THz link may be lost easily in such a sensitive system. Further, noise is an important characteristic of the THz band which may impact the interference model and signal-to-interference-plus-noise ratio (SINR) in the THz band. Due to the small wavelength at THz frequencies which is in the order of hundreds of micrometers, THz waves scatter from almost any object in a real scenario, both indoor as well as outdoor causing scattering and reflection. Due to the characteristics of THz band a highly directional antenna that may generate very narrow beams in case of THz band is required.

The transmission and/or reception in a THz band system are based on narrow beams, which suppress the interference from neighboring base stations and extend the range of a THz link. However, due to high path loss, heavy shadowing and rain attenuation, reliable transmission at higher frequencies is one of the key issues that need to be overcome to make the THz band wave systems a practical reality.

As known the cellular wireless networks are based on cellular topologies. The area is divided into cells where each cell is served by one base station (BS) or access point (AP) or transmission/reception point (TRP). Each user is served by one or more AP depending upon the technology. However, there are various limitations in the state-of-the-art cellular system, for example, in a case when users who are at the centre of the cell may achieve desired data rates but users at the cell edge fail to experience desired data rates due to inter-cell interference and handover issues which limits the cell-edge performance. Further, the cell may cover a limited number of user terminals, hence has limited capacity. Furthermore, there is an issue of load balancing in cell networks as some APs may be overloaded and other APs relatively idle. Users may be connected to a single cell, so any obstacle in the signal path may impact the signal power. In mmWave bands and high frequencies, this may lead to loss of both signal and data. As the number of users is increasing billion of devices need high throughput to satisfy the ever-increasing need for high data rates. The cellular system is unable to provide high data rates to the users particularly at the cell edge as these users may always experience interference from neighboring cells, hence impacting the throughput.

Further, a conventional cellular system may not be able to handle the 6G requirements and applications due to the limitation of coverage and capacity. The cell size may further reduce in 6G technologies due to the usage of THz frequency bands. When the cell size is reduced to tens of meters in 5G cellular networks, quickly moving terminals lead to frequent handovers in 5G cellular networks and thus providing additional latency for wireless communications. Furthermore, frequent handovers introduce potential handover failures or constant back-and-forth handovers between adjacent cells which degrades the user experience. THz system may easily be impacted due to human or environmental obstacle, therefore more communication paths are needed. Thus, there is a need to move from fixed topology to dynamic topology which may break the conventional cellular system design.

As per 3GPP TS 38.300, when a carrier aggregation (CA) is configured, the user equipment (UE) only has one RRC connection with the network. At radio resource control (RRC) connection establishment/re-establishment/handover, one serving cell provides the non-access stratum (NAS) mobility information, and at RRC connection re-establishment/handover, the destination serving cell provides the security input. This cell is referred to as the primary cell (PCell). Depending on UE capabilities, secondary cells (SCells) may be configured to form together with the PCell a set of serving cells. The configured set of serving cells for a UE, therefore always consists of one PCell and one or more SCells.

The reconfiguration, addition, and removal of SCells may be performed by RRC. At intra-NR handover, RRC may also add, remove, or reconfigure SCells for usage with the target PCell. When adding a new SCell, dedicated RRC signaling is used for sending all required system information of the SCell i.e., while in connected mode, UEs need not acquire broadcast system information directly from the SCells.

Network controlled mobility applies to UEs in RRC CONNECTED and is categorized into two types of mobility: cell level mobility and beam level mobility. Cell level mobility requires explicit RRC signaling to be triggered, i.e., handover. A lot of signaling messages are exchanged during an intra gNB handover and/or an inter-gNB handover. The handover mechanism triggered by RRC requires the UE at least to reset the MAC entity and re-establish radio link control (RLC). RRC managed handovers with and without packet data convergence protocol (PDCP) entity re-establishment are both supported. For dedicated radio bearers (DRBs) using RLC acknowledged mode (AM) mode, a PDCP may either be re-established together with a security key change or initiate a data recovery procedure without a key change. For DRBs using RLC (unacknowledged) UM mode and for signalling radio bearers (SRBs), the PDCP may either be re-established together with a security key change or remain as it is without a key change. Data forwarding, in-sequence delivery and duplication avoidance at handover may be guaranteed when the target gNB uses the same DRB configuration as the source gNB.

Timer based handover failure procedure is supported in new radio (NR). An RRC connection re-establishment procedure is used to recover from handover failure.

Now in case of a beam level mobility, the beam level mobility does not require explicit RRC signaling to be triggered. The gNB provides via the RRC signaling the UE with measurement configuration containing configurations of SS block (SSB)/channel state information (CSI) resources and resource sets, reports and trigger states for triggering channel and interference measurements and reports. Beam level mobility is then dealt with at lower layers by means of a physical layer and MAC layer control signaling, and RRC is not required to know which beam is being used at a given point in time.

Thus, it can be summarized that cell level mobility requires explicit RRC signalling to be triggered, i.e., handover. Hence, a lot of signalling messages are exchanged during Intra gNB handover, inter-gNB handover. On the other hand, beam level mobility does not require explicit RRC signaling to be triggered, however, as shown in the FIG. 1B the beam level mobility is only possible within the cell which consist of single TRP (Transmission reception point) i.e., radio unit.

The current handover system is defined for a cell-based architecture. Thus, when UE moves from one cell to another cell, the UE may perform a handover procedure and for doing so RRC signaling message is always utilized, thereby increasing overhead of the network. On the other hand, in order to avoid RRC signaling message, beam level mobility may be utilized, however the beam level mobility is only possible within the cell which consist of single TRP.

Thus, there is a need to define a new methodology for handover at the cell level and beam level for cell free kind of system. High mobility is challenging both within and between cells as the high mobility increases the risk for the service interruption and high signaling overhead. Existing beam management procedures are only applicable within a single cell and the RRC reconfiguration is required when moving between cells.

Thus, there is a need to define a new system so that the system is cell free system by defining new signaling mechanisms to handle cell based and beam level mobility to improve latency and efficiency with more usage of dynamic control signaling as opposed to RRC signaling.

Thus, as may be seen, there exists a need to overcome at least one of the aforementioned problems.

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

The present disclosure relates to wireless communication system and more particularly relates to the design of handover procedures for multi TRP system for a mobile station and other devices. Multi TRP per cell or cell less or cell free architecture removes the boundaries of the cell. In particular, a method of handover for a user equipment (UE) in a multi TRP system comprising selecting, by a source node, a set of candidate TRPs for the UE for handover operation. Thereafter, receiving, by the source node, a measurement report from the UE. The source node then determines a trigger for handover of the UE in response to the measurement report and then compares a configuration of the source node with a configuration of a candidate TRP from the set of candidate TRPs. Thereafter, the source node triggers a handover command by the source node, to perform a handover operation for the UE with at least one candidate TRP based on a result of the comparison.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1A:
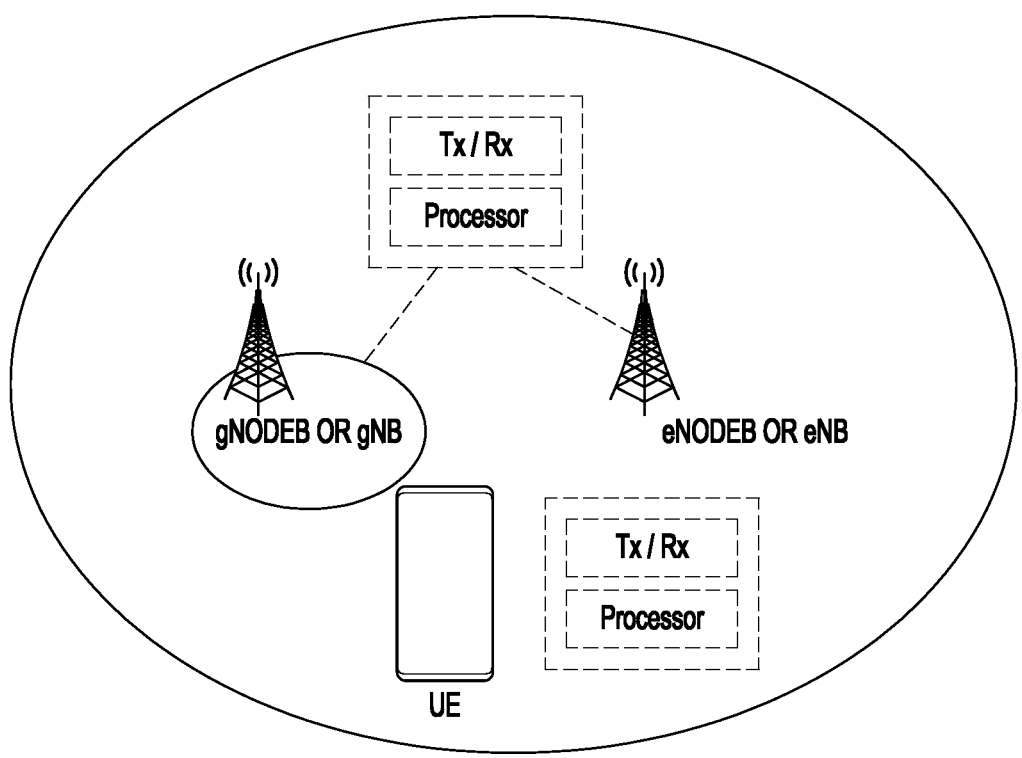
FIG. 1A illustrates an exemplary fifth generation wireless communication system, as per the state of the art.
Figure 1B:
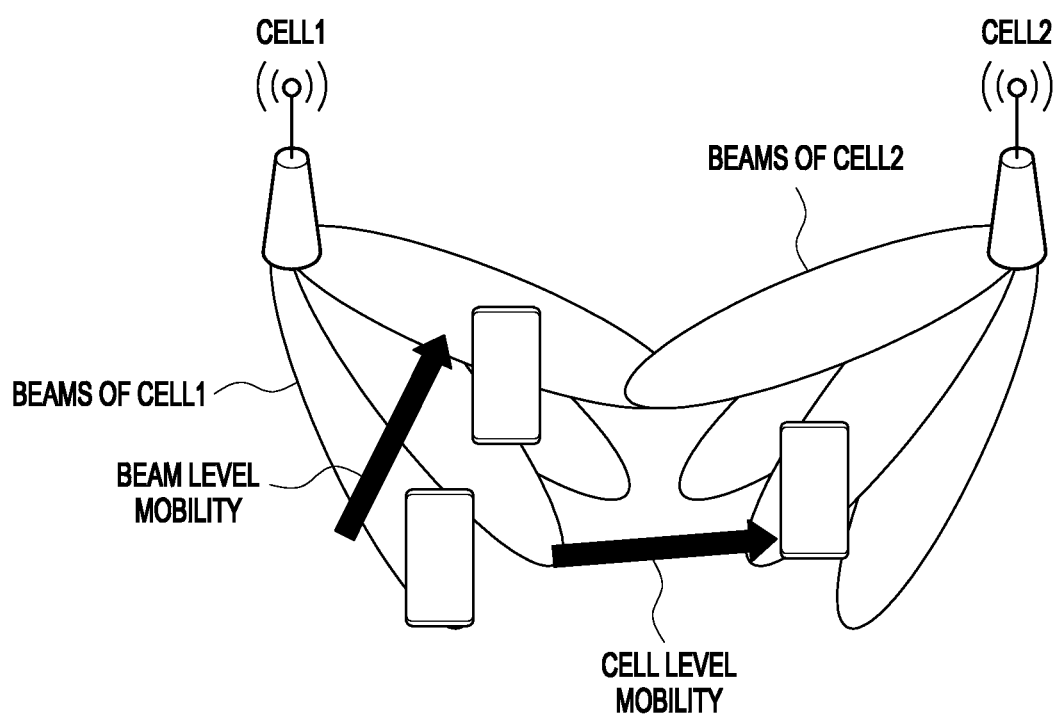
FIG. 1B illustrates a beam level mobility, as per the state of the art.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

FIGS. 1A through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

The present disclosure provides a method and system for multi TRP handover procedure for cell free or cell less or multi TRP per cell system. More particularly, the present disclosure provides a new signaling mechanism to handle cell based and beam level mobility in the cell free system for achieving high latency, high efficiency, and high throughput. Multi TRP per cell or cell less or cell free architecture removes the boundaries of the cell. The multi TRP per cell have multiple remote radio heads (RRHs)/TRPs connected to one central unit with fiber or any other backhaul system and share the same cell ID, cell ID/THz Cell ID/C-RAN ID, TRP-ID, no cell ID, or a combination thereof.

As an example, a TRP can be a radio unit (RU). Each TRP may be composed of one or more logical antennas enabling multiple beams to be formed. Each TRP may have a separate identifier or may not have any separate identifier. A UE may be aware of only THz cell ID and/or TRP ID and/or C-RAN ID. The various possible network deployment or topologies for cell free system or Multi TRP cells are explained in detail below.

Figure 2A:
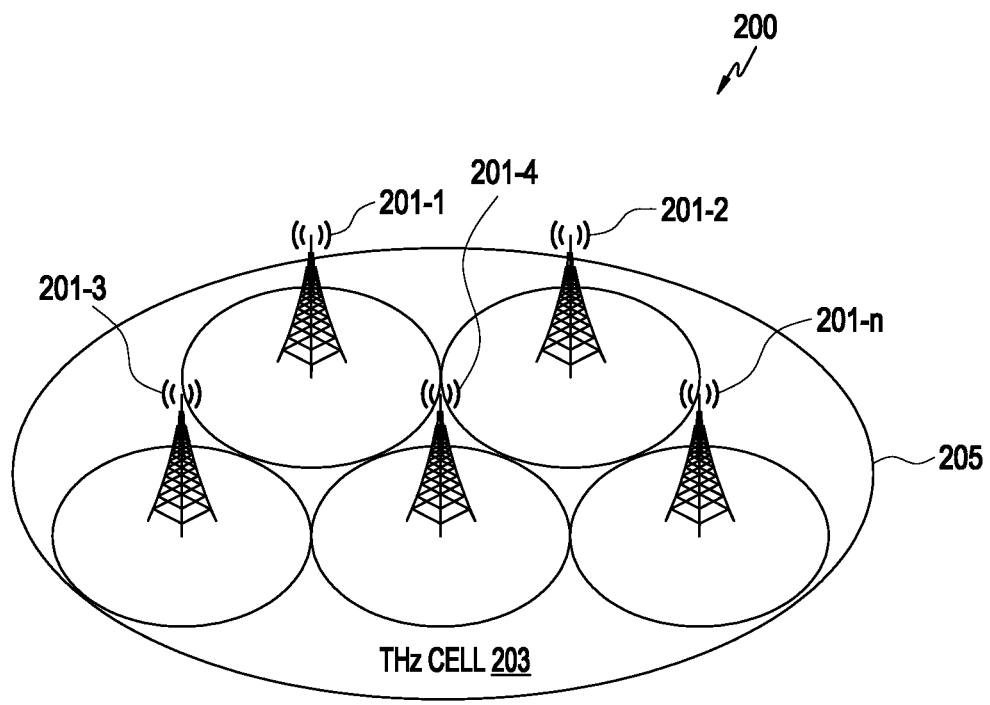
FIG. 2A illustrates an exemplary embodiment of a network topology for multi TRP per cell 200 having a common THz cell ID and with no of TRP identifier according to an embodiment of the present disclosure.

FIG. 2A illustrates an exemplary embodiment of a network topology for multi TRP per cell 200 having a common THz Cell ID and with no TRP identifier according to an embodiment of the present disclosure. Referring to the FIG. 2A is the same depicts one of the possible deployments that has multiple TRPs (201-1, 201-2, 201-3, 201-4, . . . , 201-n) which is covered under one common THz cell ID 203. An example, the TRPs (201-1, 201-2, 201-3, 201-4, . . . , 201-n) may acts as a source node or these TRPs (201-1, 201-2, 201-3, 201-4, . . . , 201-n) can be controlled by the cloud-RAN (C-RAN), a central Unit (CU), a core network (NW), a distributed unit (DU) or a TRP controller or the any other possible NW entity to perform the functionalities of the source node without deviating the scope of the disclosure. Further, the source node, the C-RAN, the vRAN controller, the CU, the NW, the DU, the network node or the TRP controller or the any other possible NW entity can be interchangeably used throughout the specification without deviating from the scope of the disclosure. The region 205 may have the one or more source node. The TRPs (201-1, 201-2, 201-3, 201-4, . . . , 201-n)) can be controlled by TRP controller which is controlling multiple TRP or any other NW entity, CU or DU. Thus, for example, if a UE currently is being served by the TRP 201-1 then the TRP 201-1 becomes the source node and when the UE moves from one node to the other node then the other node, let say UE moved from the node 201-1 to 201-2, then 201-2 becomes a target node. For ease of understanding the TRPs (201-1, 201-2, 201-3, 201-4, . . . , 201-n) has been addresses as a source node throughout the description. The source node can also be TRP controller (TRP-C) which mainly controls the multiple TRPs. This source node and all other nodes are controlled by different TRPs.

A range of THz cell ID 203 depends upon at least one of network topology, services or network architecture. The network node or the source node may report the THz cell ID only to the UE, and thus the UE is not aware which TRP is serving it. There may be other identifiers also for this particular region which may be based on a NW decision. For example, the identifiers may be C-RAN ID or CU ID or DU ID. The TRPs under one C-RAN may be of same or different frequency. Further, the reference numerals were kept same wherever applicable for the sake of brevity and easy understanding.

Figure 2B:
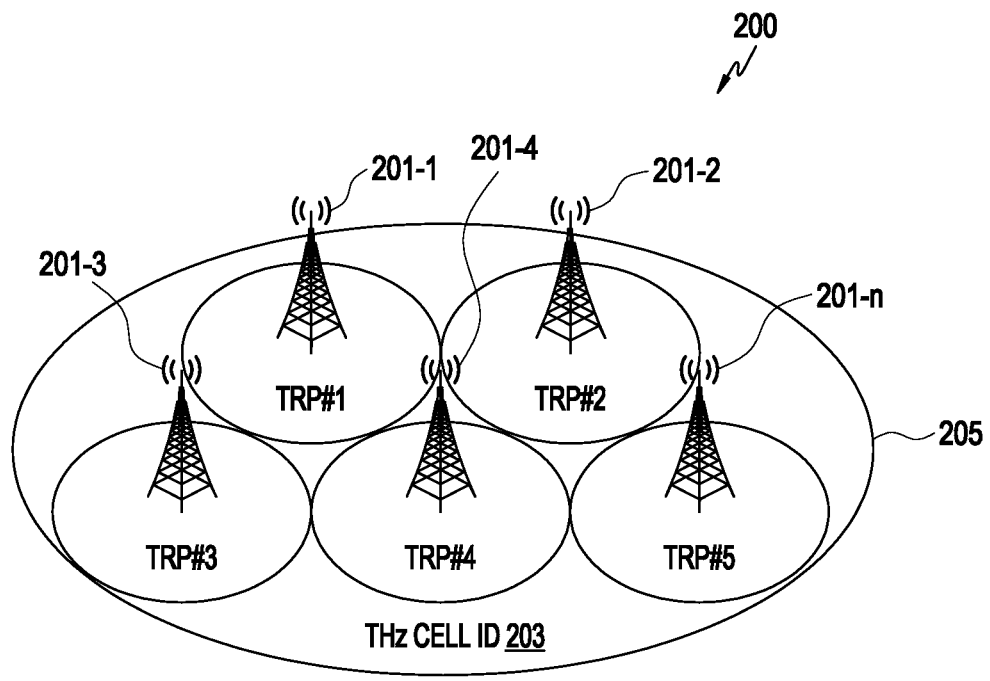
FIG. 2B illustrates an exemplary embodiment of another possible network topology for multi TRP per cell 200 having a common cell ID for multiple TRP with a unique TRP identifier for each TRP according to an embodiment of the present disclosure.

FIG. 2B illustrates an exemplary embodiment of another possible network topology for multi TRP per cell 200 having a common Cell ID for multiple TRP with a unique TRP identifier for each TRP according to an embodiment of the present disclosure. FIG. 2B considers a scenario depicting, another possible deployment of multi TRP per cell 200. The network topology provides multiple TRPs (201-1, 201-2, 201-3, 201-4, . . . , 201-n) which may be covered under one common THz cell ID 203 or any other cell ID 203 or C-RAN ID 203 which belongs to 5G or 6G or beyond 5g or any other wireless system. Each TRP may have unique TRP ID, for example, TRP#1, TRP#2, TRP#3, TRP#4, and TRP#5. The network may report THz cell ID or Cell ID as well as TRP ID to the UE, alternatively the network may only report the TRP ID to the UE. Here cell or area or region may have multiple TRPs. It may be similar to cells have multiple beams. The network may provide the common identifier to decode the data instead of a cell specific RNTI or a UE specific identifier. All the TRPs within the system may be synchronized or not synchronized. The UE may be served with a single TRP or multiple TRP. Multi TRP transmission is a key feature for improving throughput, robustness, and reliability.

Figure 2C:
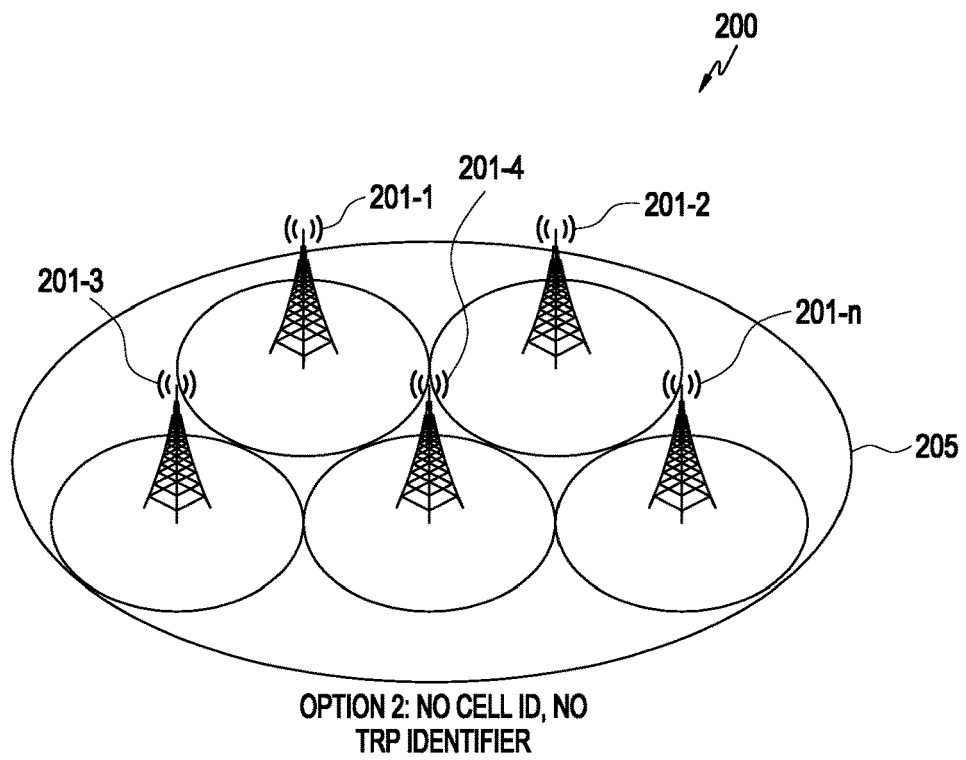
FIG. 2C illustrates an exemplary embodiment of another possible network topology for multi TRP per cell 200 having no cell ID for multiple TRP and no TRP identifiers for each TRP according to an embodiment of the present disclosure.

FIG. 2C illustrates an exemplary embodiment of another possible network topology for multi TRP per cell 200 having no Cell ID for multiple TRP and no TRP identifiers for each TRP according to an embodiment of the present disclosure. As can be seen for the FIG. 2C, the network topology provides multiple TRPs (201-1, 201-2, 201-3, 201-4, . . . , 201-n) however, the multiple TRPS does not have any unique identifier nor the region 205 has any common cell ID.

Figure 2D:
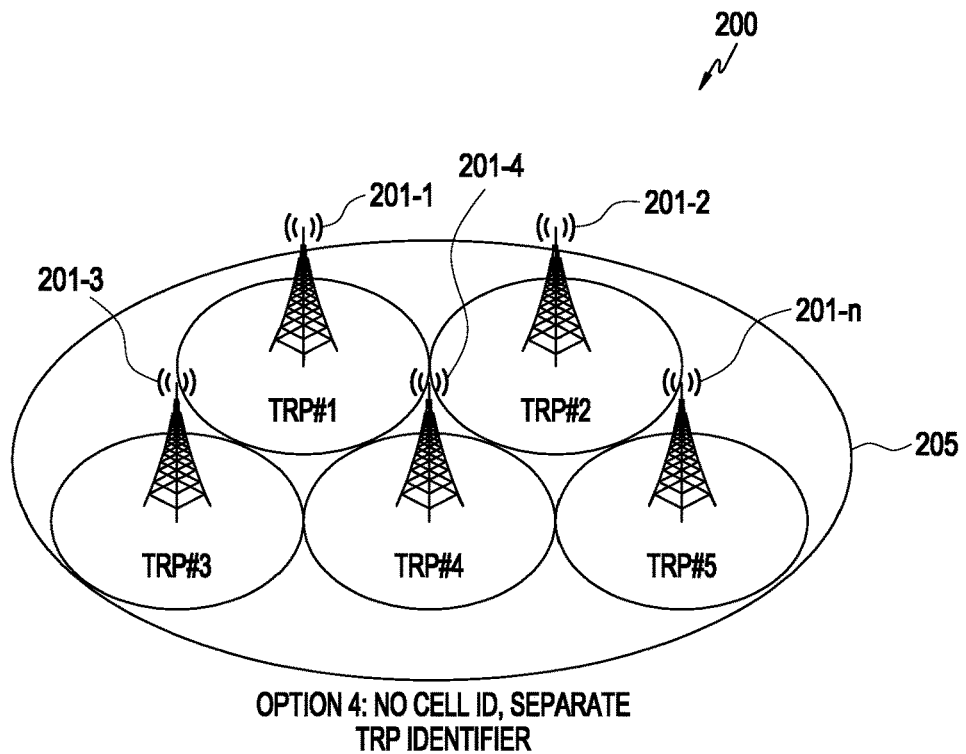
FIG. 2D illustrates an exemplary embodiment of another possible network topology for multi TRP per cell 200 having no Cell ID and a unique TRP identifier for each TRP according to an embodiment of the present disclosure.

FIG. 2D illustrates an exemplary embodiment of another possible network topology for multi TRP per cell 200 having no Cell ID and a unique TRP identifier for each TRP, according to an embodiment of the present disclosure. As can be seen for the FIG. 2D, the network topology provides multiple TRPs (201-1, 201-2, 201-3, 201-4, . . . , 201-n) where each TRP may have unique TRP ID, for example, TRP#1, TRP#2, TRP#3, TRP#4, and TRP#5. However, the multiple TRPS does not have any common cell ID.

Thus, there is a need to define new cell level and beam level procedures to handle new network topology which may be based on cell free system. These new procedures may also be extended to the existing system as the current system are inefficient and cause signaling overhead, interruption in ongoing services. Thus, there is a need to define the handover procedure associated with multiple TRPs for the following cases.

Addition/deletion of TRP.

TRP level mobility.

Data transmission/reception with multiple TRP.

The present disclosure provides solution for the deployments for cell less system in the following scenarios which can be implemented in any of the network topologies as described in the FIGS. 2A-2D above with various possible combinations and scenarios as consider below:

Common THz cell ID, no TRP identifier: a UE is only aware of cell ID;

Common THz cell ID, separate TRP identifier: a UE is aware of cell ID as well as TRP ID;

Common C-RAN ID, no TRP identifier: a UE is aware of common identifier which UE uses for camping and other procedures;

Common C-RAN ID, separate TRP identifier: a UE is aware of common RAN ID as well as TRP ID;

Separate TRP identifier: a UE is aware of TRP ID which may act as Cell ID; and/or Common THz cell ID, the same TRP identifier: a UE is aware of Cell ID as well as TRP ID.TRP ID is same within one region or under same central entity.

Apart from this, the deployment may consist of any combination of above mentioned types of deployments. The system described here is in context of cell which has multiple TRPs and further multiple beams. The same may be extended where the network may comprise at least one of one cloud cell or super cell which may have multiple TRPs or multiple small cells. Each cell may or may not have any cell boundary and each cell or TRP may have multiple or single beam. The cell and TRP terms used in this disclosure may be interchangeable without deviating from the scope of the disclosure.

Figure 3:
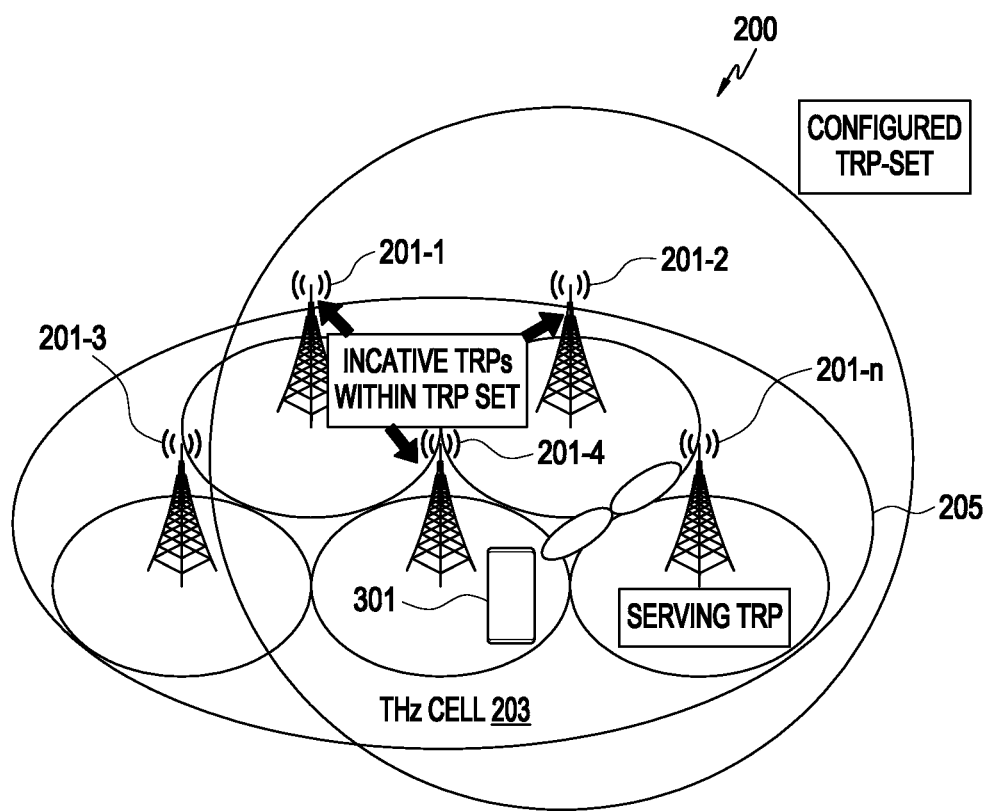
FIG. 3 illustrates an exemplary embodiment of possible network topology for multi TRP per cell having a common Cell ID for multiple TRP for configured set of TRPs which may serve the UE according to an embodiment of the present disclosure.

FIG. 3 illustrates an exemplary embodiment of possible network topology for multi TRP per cell having a common Cell ID for multiple TRP for configured set of TRPs which may serve the UE according to the embodiment of the present disclosure. Each TRP may have a unique TRP identifier or may not have the TRP unique identifier as described above. The NW may configure multiple TRPs which may serve the UE 301. For example, TRPs that are shown in the FIG. 3 as a configured set of TRP's are **201-1, 201-2, 201-4, 201-*n*. Further, as an example, the configured set of the candidate TRPs includes a serving TRP set and a candidate TRP set for the UE. For example, 201-*n* is a serving TRP from which the UE 301** is currently being served.

The number of TRPs or a candidate TRPs or a set of candidate TRPs which may serve the UE 301 depends upon various criteria. The various criteria, may include, for example, but not limited to, a UE capability, an RF capability or a RF conditions of the UE, a current load condition, UE data rate requirements, and a UE location etc. All TRPs or some or may be one TRP may serve the UE. These configured TRP set comprises an active or a current TRP(s) and a candidate or an inactive TRP(s). The active TRP may be TRP or set of TRPs which is currently serving the UE i.e., data transfer is taking place between the UE and the TRP(s). The candidate or inactive TRP(s) comprises TRP(s) which are currently not serving the UE, but when the UE comes into vicinity of these TRP(s) that may serve the UE. As an example, the active or the current TRP(s) as shown in the FIG. 3 may be **201-*n* and the candidate or the inactive TRP(s) 201-1, 201-2, 201-4**. The activation/deactivation or addition/deletion of these TRPs is based on a NW decision which depends on the various criteria as disclosed above.

Figure 4:
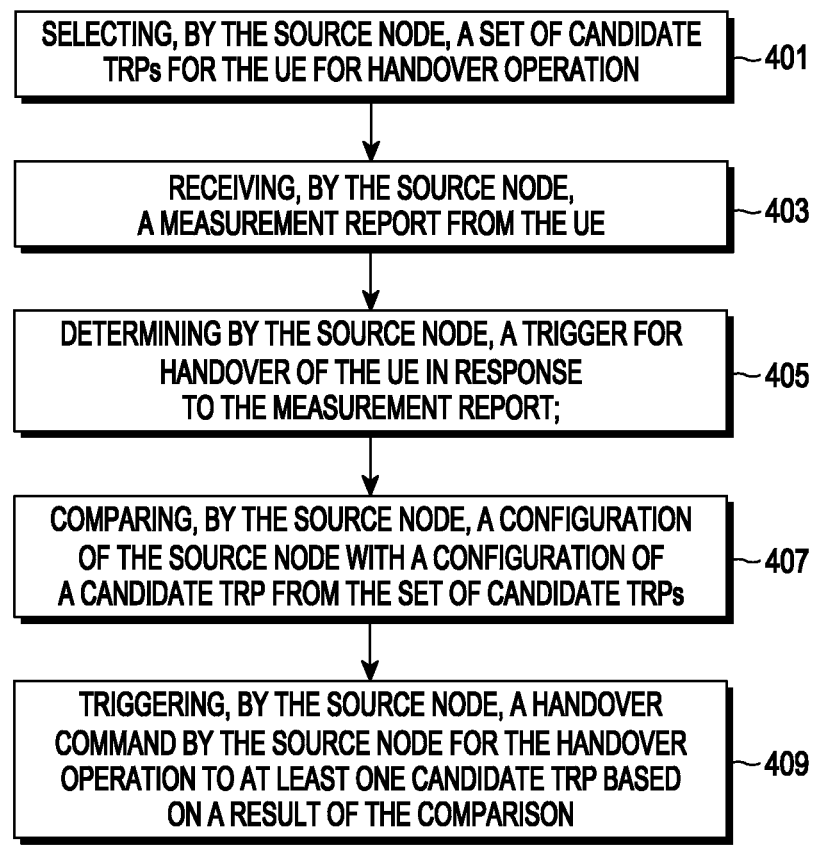
FIG. 4 illustrates a flow diagram of a handover procedure in a multi-TRP system according to an embodiment of the present disclosure.

FIG. 4 illustrates a flow diagram of a handover procedure in a multi-TRP system according to h an embodiment of the present disclosure. Referring to the FIG. 4, a method 400 may be implemented in a source node deployed in any of network topology, for example, but not limited to, as shown in the FIGS. 2A-2D and/or 3. However, explanation will be made herein with respect to FIG. 3. The method 400 provides a new procedure to handle any of the TRP level mobility and/or the beam level mobility i.e., inter TRP beam mobility particularly in the multi-TRP system. In particular, the TRP level mobility does not require explicit RRC signaling to be triggered. The gNB or 6G node or TRP controller or source node provides, via RRC signaling, to the UE 301 with measurement configuration of the nearby UEs comprising configurations of SSB/CSI resources, resource sets, reports, and trigger states for triggering channel and interference measurements and reports. The TRP level mobility is then dealt with at lower layers by means of physical layer and MAC layer control signaling defined as L1/L2 level signaling, and RRC signaling may be defined as L3 level signaling is not required to know which TRP is being used at a given point of time. The RRC signaling may only be aware of THz cell. Thus, Inter-TRP/beam mobility or inter-cell beam mobility may be possible without RRC messages. TRPs or cells involved in the Inter-TRP beam mobility may belong to same TRP-C or cell or may be served through common scheduler say DU or CU. In an implementation, the method for TRP change handover procedure for cell free system or multi-cell TRP system, the source node may perform the method 400.

At step 401, the method 400 comprises, selecting, a set of candidate TRPs for the UE for handover operation. In the particular, the source node which can be TRP **201-*n*** or the TRP controller selects the set of candidate TRPs based on the various criteria, as explained above, the UE capability, the RF capability or RF conditions of the UE, the current load condition, the UE data rate requirements, the UE location etc. In an example, since the UE is currently camped on the source node. Further, a configured set of TRPs is obtained from the selected set of candidate TRPs.

At step 403, the source node receives a measurement reports from the UE 301. As an example, the measurement reports may include evaluation results of the measurement control information provided by the source node prior to the step 401. of the nearby UEs. In particular, these reports may be received through RRC messages or may be received through MAC or L1 signaling. The measurement reports that are received through RRC messages may be event triggered or based on periodic measurements. The measurement reports that are received through MAC or L2 level may be received through MAC control element which includes a TRP ID, a cell ID, reference signal received power (RSRP), reference signal received quality (RSRQ), or any other measurement related parameters and beam ID. The UE measures multiple beams of at least one of a cell or TRP and the measurements results i.e., power values are averaged to derive the cell or TRP quality. The cell or TRP quality from beam measurements is derived in the same way, for the serving cell(s) and for the non-serving cell(s). Measurement reports may contain the measurement results of the X best beams if the UE is configured to do so by the NW. The cell, TRP and beam measurement quantities to be included in measurement reports are configured by the network. The measurement reports may also be received through UL CSI at L1 level. These reports contain RSRP, RSRQ or any other measurement quantity which may be used to change the beam or TRP or cells.

After receiving the measurement report, at step 405, the source node 201-n or TRP controller or any NW entity determines a trigger for handover of the UE 301 in response to the measurement report. In particular, the source node or gNB or 6G node or TRP-C takes the TRP change decision based on the received measurement reports.

At step 407, the source node compares a configuration of the source node with a configuration of a candidate TRP from the set of candidate TRPs. As an example, the configuration of the source code may include, but not limited to, the configuration of the source node or the candidate TRP is related to at least one of RRC, packet data convergence protocol (PDCP), medium access control (MAC), radio link control (RLC), physical layer or security key parameters.

At step 409, the source node, triggers a handover command for the handover operation to perform handover operation for the UE with the at least one candidate TRP based on a result of the comparison. In an implementation, an L2 level handover is triggered if the result of the comparison corresponds to the configuration of the candidate TRP being similar to that of the configuration of the source node. If the result of the comparison corresponds to the configuration of the candidate TRP being different to that of the configuration of the source node or if the UE is being incompatible with the configuration of the candidate TRP then an L3 level handover is triggered.

As an example, if the TRP change is within the same logical entity then there is no need for handover preparation between two nodes until THz cell area changes, thus a core NW signaling during handover may reduce depending on THZ cell range. That is to say, during inter-cell beam mobility or inter TRP beam mobility or inter TRP change or inter cell change, if source TRP and target belongs to different logical entity which may be TRP-C or C-RAN or CU then there may need of some interaction between source and target node to complete handover procedure. Thus, in this scenario, additional core NW signaling may be required for handover. Source and target NW entities can interact with each other through X-X interface and complete the handover mechanism. If central entity is same for source and target TRP node then central entity can take decision without involving other NW entity and can transfer the messages and pending data from one node to another.

Further, to the triggering of the L2 level handover, the source node sends a MAC CE or a lower layer signaling message as the handover command to perform TRP switching operation as the handover operation to the at least one candidate TRP after the trigger of the L2 level handover. In an implementation, the MAC CE or the lower layer signaling message includes a MAC control element (MAC CE) formats as shown in FIG. 5 which may be used for TRP change or TRP activation/deactivation or addition/deletion procedure.

Figure 5:
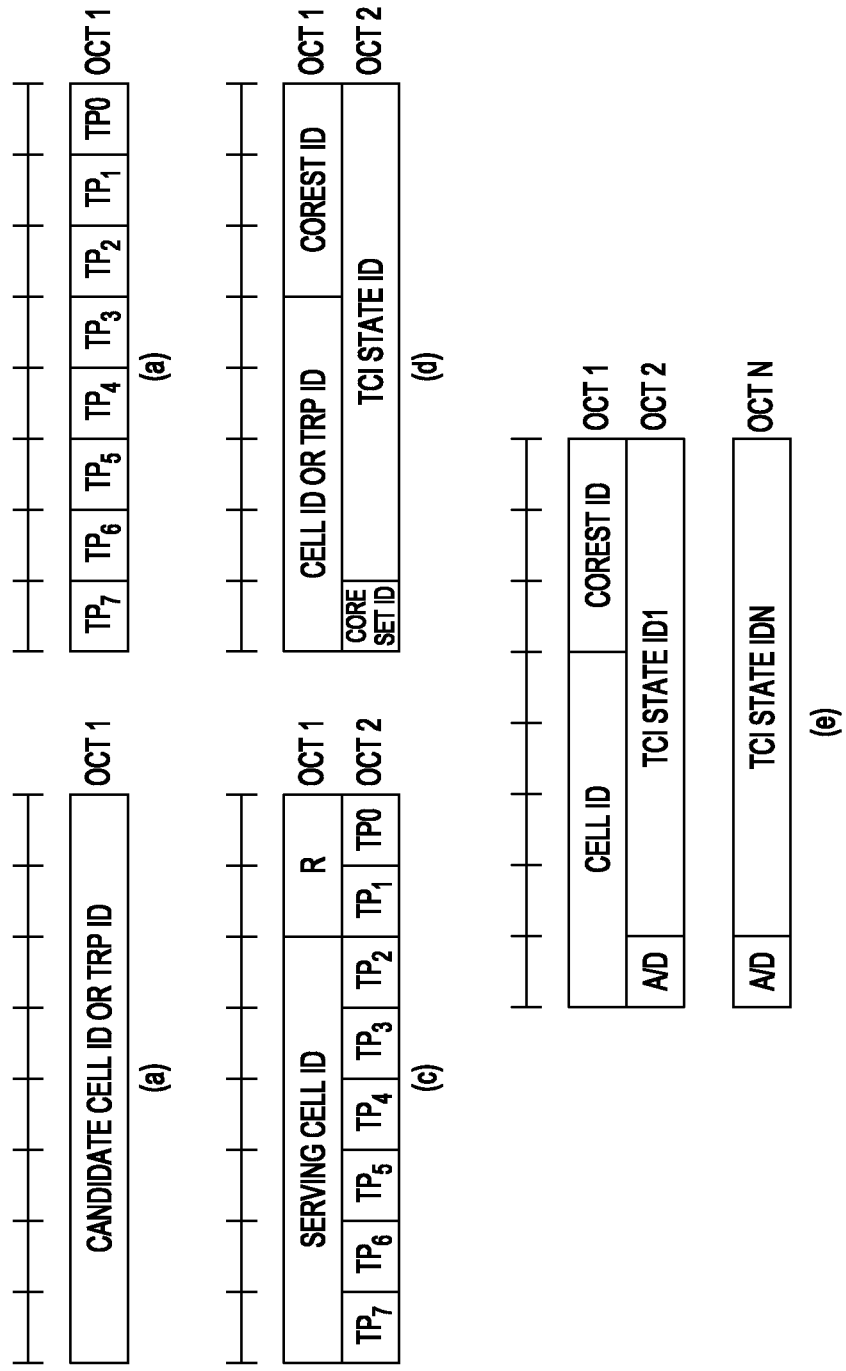
FIG. 5 illustrates various MAC control element (MAC CE) formats according to an embodiment of the present disclosure.

Now during the L2 level handover the source node sends a MAC CE or a lower layer signaling message for TRP change includes, for example, but not limited to, a) a TRP ID or cell ID of the at least one candidate as shown in (a) of FIG. 5; or b) a TRP ID or cell ID along with beam index of the at least one candidate as shown in (d) of FIG. 5. As an example, the MAC CE format as depicted in the (a) of FIG. 5, the MAC CE format includes single byte which refers to TRP ID to which the UE may perform the switching or handover. The TRP switching MAC CE of one octet is identified by a MAC sub-header with a logical channel ID (LCD). Candidate or target Cell ID or TRP ID field indicates the identity of the target serving cell per TRP for which the UE may synchronize. The length of the field is 5 bits or 8 bits. In case of 5 bits, other bits may be reserved bits (R). The MAC CE sub-header has logical channel ID from which it may understand that this MAC CE is for TRP switching. Further, any value from reserve LC ID may be used. There may be additional Length field that may be included in sub-header that indicates the length of the corresponding MAC SDU or variable-sized MAC CE. This, can be the case when additional information is added to acquire the beam or TRP ID, say transmission configuration indicator (TCI) state. In case that MAC CE is of fixed size, then this length field is not required. In case that a NW indicate through L1 signaling, this information may receive in DCI or any other possible physical channel along with TRP ID.

As another example, the MAC CE format as depicted in the (d) of FIG. 5, the MAC CE format consists of the target TRP or Cell ID along with beam index. TRP switching and TCI switching can be given together in a single MAC CE where a NW can send the TRP ID and TCI state so that a UE can move to new TRP and perform beam switching. The TCI state ID may be used to determine the beam or TRP ID based on the configuration provided by the RRC.

Each of the field of MAC CE format as shown (d) of FIG. 5 is explained in detail below.

Cell ID or TRP ID: this field indicates the identity of the candidate or serving Cell for which the MAC CE applies. The TCI state ID may be used to determine the beam or TRP ID based on the configuration provided by the RRC. Once the UE determines next beam or TRP associated with the TCI, the UE may move to the new beam or TRP and synchronize with the NW. The NW may activate or deactivate the TCI states associated with serving TRP or neighboring TRP as shown in (e) of FIG. 5. The UE on receiving the MAC CE activate and deactivate the specific TCI field which may be associated with specific TRP. Thus, the UE need not to know about each TRP. The MAC CE may also be designed for each cell or TRP which is currently serving the UE and may also be used to change the TRP or cell or activate or deactivate the specific TRPs without any RRC message. Each of the field MAC CE format is explained in detail below.

CORESET ID: this field indicates a control resource set identified with ControlResourceSetId as specified in TS 38.331, for which the TCI State is being indicated. In case the value of the field is 0, the field refers to the control resource set configured by controlResourceSetZero as specified in TS 38.331. The length of the field is 4 bits.

TCI State ID: this field indicates the TCI state identified by TCI-StateId as specified in TS 38.331 applicable to the control resource set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active bandwidth part (BWP). If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits. The UE may also use the TCI States activation/deactivation for UE-specific PDSCH MAC CE as defined in TS 38.321 to activate and deactivate various TCI states and associated TRP or beams with these TRPs. The UE may also use TCI State Indication for UE-specific PDCCH MAC CE to change the TRP. The NW may provide TCI state ID through which the UE determines a new beam index.

TRP switching and TCI switching can be given together in a single MAC CE where a NW can send the TRP ID and TCI state so that a UE can move to new TRP and perform beam switching. MAC CE for TRP switching and beam change can also be combination of any of above provided mechanism.

According to an embodiment of the present disclosure, after the triggering of the L2 level signaling the source node may be configured to modify the configured set of candidate TRPs that may include the serving TRP set and the candidate TRP set for the UE for TRP switching operation. The modification includes an addition or deletion of at least one candidate TRP based on the criteria. As an example, the modification may include, for example, the modification of a serving TRP set comprised in the configured set of the candidate TRPs, modification of one or more candidates comprised in the configured set of the candidate TRPs, modification of one or more candidate TRPs, and serving TRPs comprised in the configured set of the candidate TRPs. Thus, in order to modify the configured set of candidate TRPs, the source node sends a MAC CE or a lower layer signaling message indicating modifying a configured set of the candidate TRPs comprising a serving TRP set and a candidate TRP set for the UE by addition or deletion of at least one candidate TRP based on the criteria.

Now during the L2 level handover the source node sends a MAC CE or a lower layer signaling message for modifying the configured set of the candidate TRPs. The MAC CE or the lower layer signaling message, for modifying the configured set of the candidate TRPs, incudes the MAC CE formats, for example, but not limited to a) a TRP or a Cell ID or an activation/deactivation or add/delete of the at least one serving TRP from the configured set of candidate TRPs as shown in (b) of FIG. 5; or (b) an activation/deactivation or addition/deletion of the at least one candidate TRP from the configured TRP set along with a beam index as shown in (c) of FIG. 5.

The MAC CE format as depicted in the (b) of FIG. 5, the MAC CE format may be used for TRP change or TRP activation/deactivation or add/delete of the at least one serving TRP from the configured set of candidate TRPs procedure, according to an embodiment of the present disclosure. The number of octets needed in this MAC CE depends upon number of TRPs that the NW may configure for the UE. In the (b) of FIG. 5 for sake of brevity a single octet is shown assuming that number of TRPs are 8 at the maximum, however the number of TRPs may be more and the limitation of 8 TRs in the FIG. is only for illustration purpose. RRC signals different TRPs and associated configuration to the network. Each TRP configuration has a corresponding TRP index or TRP id to differentiate between the configurations. As shown in example below each TPi field refers to the TRP ID which may be configured by RRC message. The TPi field is set to 1 to indicate TRP switching or TRP change i.e., the indicated TRP may be the current TRP and UE may move to this TRP i.e., a UE may associate and apply configuration of this TRP. The TPi field is set to 0 to indicate that the TRP with TRP index i may be removed from the active set. Another interpretation is this TRP is no more serving TRP and UE may release all the configuration associated with this TRP. This octet may also consist of R bit that is reserved bit which can be ignored by the UE. A NW may set the bit of TPi which the NW wants to make as a serving cell. This format may also be used to add/delete the active TRPs for the UE. Once the UE adds/deletes or changes the TRP corresponding configuration may also change. The NW can then send the RRC message to provide the change configuration either through dedicated message or common message. Once the UE receives the MAC CE to change the TRP or activate/deactivate or add/delete the TRP then the UE can indicate the upper layers to take further action like re-establish, data recovery or sending status PDU.

The MAC CE format as depicted in the (c) of FIG. 5, the MAC CE format consists of may be used an activation/deactivation or addition/deletion of at least one candidate TRP from the configured TRP set along with a beam index, according to an embodiment of the present disclosure. When the UE receives the MAC CE, the UE adds or deletes the TRP in active TRP set. The TRP Activation/Deactivation MAC CE of one octet is identified by a MAC sub-header with LCID. The size of MAC CE depends upon how many TRPs may be part of configured set or active set. Instead of TRP, a NW may also indicate the Cell i.e., Ci. Each of the field MAC CE format is explained in detail below. Each of the field of MAC CE format is explained in detail below.

TPi: If there is a TRP configured for the RRC/MAC entity with TRPIndex i then this field indicates the activation/deactivation status of the TRP with TRP Index i, else the MAC entity may ignore the Ti field. The Ti field is set to 1 to indicate that the TRP with TRPIndex i, may be activated. The Ti field is set to 0 to indicate that the TRP with TRPIndex i, may be deactivated.

R: reserved bit, set to 0.

Serving cell ID: this field indicates the identity of the serving cell which may act as Pcell if the multiple TRPs are active. This is particular needed when a UE is working on carrier aggregation mode or multi TRP mode where one TRP is acting as Pcell and other TRPs are acting as Scell(s). Once the UE receives this information MAC layer may also update the higher layer to configure or release the information associated with TRP. RRC may already have required configuration for TRP. This can also be used when any Secondary serving cell can be changed to primary serving cell and vice versa.

Now, further to the step 409, where the L3 level handover is trigger in a case when the configuration of the candidate TRP being different to that of the configuration of the source node or if the UE is being incompatible with the configuration of the candidate TRP, the source node sends an RRC message as the handover command along with configuration information to perform TRP switching operation as the handover operation to the at least one candidate TRP after the trigger of the L3 level handover.

Thus, after, completion of the handover procedure as described above at the UE side, the source node is further configured to receive a handover complete message via a MAC CE or a lower layer signaling message or via RRC message from the UE after performing handover operation at the UE to the at least one candidate TRP. FIG. 5 (e.g., (e) of FIG. 5) illustrates the MAC CE message that includes a MAC CE format for sending the handover completion.

Figure 6:
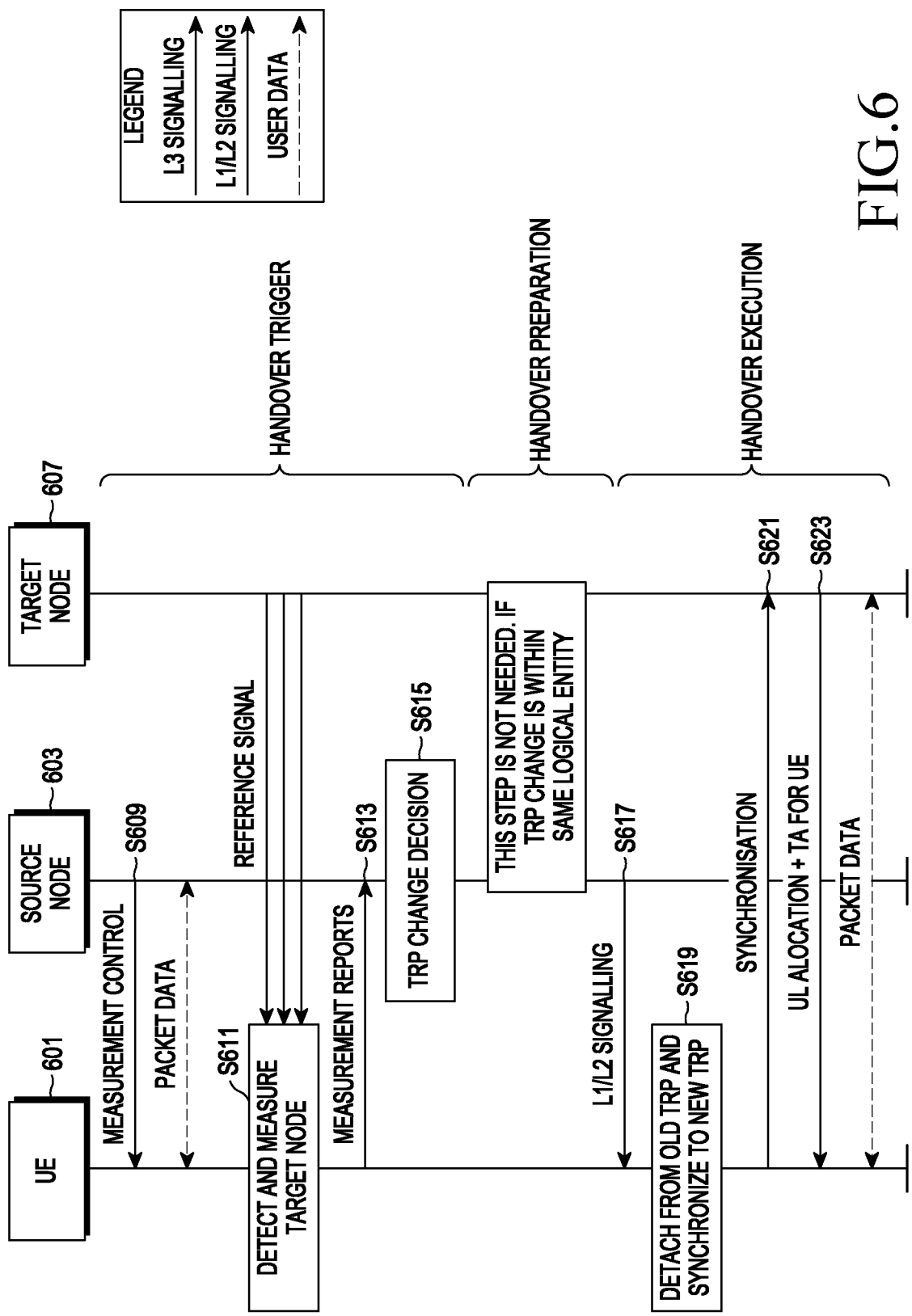
FIG. 6 illustrates a complete signal flow diagram with respect to the UE, a source node and a target node according to an embodiment of the present disclosure.

FIG. 6 illustrates a complete signal flow diagram with respect to the UE, a source node and a target node according to an embodiment of the present disclosure. The FIG. 6 will be described by referring to the FIGS. 4 and 5 as described above. Referring to the FIG. 6, the system 600 may corresponds to may be deployed in any of network topology, for example, but not limited to, as shown in the FIGS. 2A-2D and/or 3. The system 600 includes the UE 601 which is currently served by the source node 603. As an example, the UE moves from source node to a target node 607. The complete signal flow for performing the handover in the multi TRP system as shown in the FIGS. 2A-2D is being illustrated. The method performed at the source node 603 is same as the method described in the FIG. 4. Thus for, the sake of brevity explanation of some steps as applicable is being omitted. In an implementation, the method for TRP change handover procedure for cell free or a multi-TRP system comprises the following steps:

At S609: a source node or gNB 603 transmits a measurement control to the UE 601 via L3 signaling.

Thereafter, at S611, the UE 601 detects and measures a reference signal that was transmitted from the target node 607. These received reference signal may be configured through L1/L2 level for faster measurement. The NW may configure the UE 601 to monitor any reference signal (RS) which may be CSI-RS or TRP specific RS or any other reference signal for evaluating the TRPs, and beams.

After the detection and measurement of a reference signal at the S611. the source node or gNB 603 at step S613 receives from the UE 601 the measurement Reports. The step S611 corresponds to step 403 of the FIG. 4, hence for the sake of brevity description is being omitted here.

Based on the received measurement reports at S611, the source node 603 takes a TRP change decision at step S615 after comparing the configuration of the source node with the configuration of a candidate TRP from the set of candidate TRPs. Accordingly, the source node 603 triggers a handover command for the handover operation to at least one candidate TRP based on a result of the comparison as described in the step 407. The step S615 corresponds to step 409 as describe in the FIG. 4, hence for the sake of brevity description is being omitted here. In an implementation the handover preparation phase is not needed, if the TRP change is within the same logical entity.

At step S617: the source node or gNB or 6G node or TRP-C or DU or CU transmits L1/L2 signaling to the UE. Thus, the NW may indicate the TRP through L1/L2 signaling about the TRP change command. Thereafter, the UE detach from old TRP and synchronizes with new TRP at step S619.

At step S621: the UE 601 synchronizes with the target node 607 and perform the RACH procedure if needed.

At step 623: the NW or the target node 607 then shares the timing advance (TA) for the UE to the UE if RACH is not executed at step S621 and shares the uplink grants to transfer the data.

Figure 7:
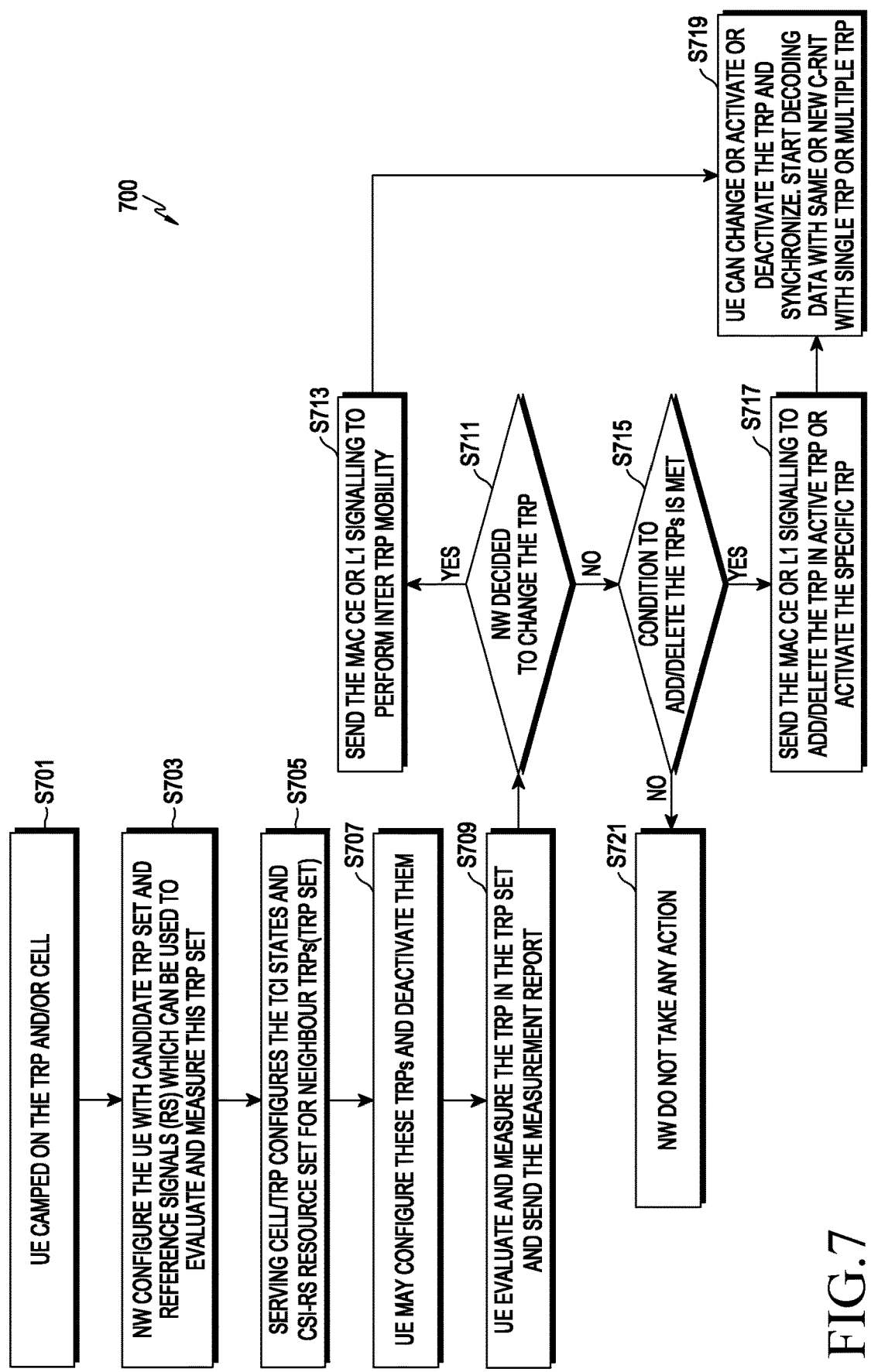
FIG. 7 illustrates the details of procedure for TRP change handover procedure when UE aware of TRP ID according to an embodiment of the present disclosure.

FIG. 7 illustrates the details of procedure for TRP change handover procedure when a UE is aware of TRP ID, according to an embodiment of the present disclosure. The method 700 may be implemented in the network topology as shown in FIGS. 2B and 2D, where the UE is aware of TRP ID. The method 700 will be describes referring to the FIGS. 4, 5, and 6.

At step S701: the UE camped on the TRP of a serving node. This TRP belongs to specific logical entity which consists of cell or super cell or area served through TRP-C or distributed unit (DU) or central entity (CU) or the like.

At step S703: the NW configures the UE with candidate TRP set. This candidate TRP set may belong to the same TRP-C or DU or some other NW entity or the candidate TRP set may belong to different logical entity which is controlled through another DU or TRP-C or any other NW entity. This TRP set may be used to serve the UE for data transmission and reception simultaneously. The NW configures the CSI-RS or TRP specific Reference signal or any Reference signal related information which may be used to evaluate this TRP set.

At step S705: the serving TRP configures the CSI-RS or any other RS information for neighbor TRPs. Also, serving cell/TRP configures the TCI states for neighbor TRPs. The above information may be used to perform the TRP switching. The UE may be configured with a list of TCI-State configurations, CSI-RS-Resource mapping, CSI-MeasConfig for beam and TRP measurements through RRC message for the serving cell and other cells or TRPs added in the TRP set or neighbouring cells or TRP.

Optionally at step S707: the UE may configure these TRPs and deactivate them. Alternatively, the UE may just perform the evaluation and measurements on these TRPs which are provided in candidate TRP set. The UE may only configure and activate them if the NW instructs to add or switch to the TRPs provided in the TRP set. As an example, the deactivation of the TRPs provides faster switching. This step helps the UE to move quickly on a new TRP when the NW instructs the UE to move to new TRP as the NW already have applied configuration which saves processing delay during TRP change procedure. Based on a NW decision when the NW instruct the UE to move or activate new TRP, the UE can immediately start the data transmission without any processing delay.

At step S709: the UE evaluates the candidate TRPs in this set and send the UL CSI accordingly to the NW. The measurements are performed on DL CSI-RS or any other RS, for example, TRP specific RS where the index of the RS is provided to the UE along with the configuration required to generate CSI-RS sequence for these CSI locations. The UE may report these measurements at L1 or L2 or L3 level which may be periodic or event triggered or aperiodic. The step S709 corresponds to step S613 of FIG. 6 and step 403 of FIG. 4.

At step S711: on receiving the reports from the UE, the NW decides whether to perform path switching or not. When the decision at step S711 is yes then step S713 is performed else step S715 is performed. The step S711 corresponds to step S615 of FIG. 6 and step 409 of FIG. 4.

At step S713: the NW decides to change the TRP and step S613 is performed. The NW sends the L1 signaling or MAC CE to switch to the new TRP to the UE. The MAC CE may have TRP ID, to which the UE need to perform the switching. Thus, the need for RRC signaling message is being avoided. The NW may use any MAC CE formats as defined above at FIG. 5.

At step S715: the NW decides condition to add/delete the TRP's is met. When the aforesaid condition is met then step S617 is performed. As an example, TRPs which may serve the UE depends upon criteria, may include, for example, but not limited to, a UE capability, an RF capability or a RF conditions of the UE, a current load condition, UE data rate requirements, a UE location etc.

At step S717: the NW sends the L1 signaling or MAC CE to activate/deactivate the TRP to the UE. When the UE receives the MAC CE, the UE adds or deletes the TRP in active TRP set.

Thereafter, the NW sends the C-RNTI to the UE or allows the UE to continue decoding with same C-RNTI. Thus, the need for RRC signaling message is being avoided.

At Step S719: the UE may either perform the TRP switching or activate or deactivate the TRP and synchronize to the new TRPs and start decoding the data based on MAC CE. The new TRP was a part of TRP set. The UE starts decoding data with same or new C-RNTI with single TRP or multiple TRP. Each TRP may have separate C-RNTI or have a common C-RNTI.

At Step S721: in case the condition to add/delete the TRPs is not met at S715 then the NW does not take any action.

There is another possibility where a UE is not aware of the TRP set. In that case serving TRP provides TCI states and quasi co-location (QCL) of 5G NR reference signals for neighbouring cells or TRP. The UE send the reports based on these reference signals. On receiving the same NW provides the MAC CE for change the serving TRP. The NW may also send a list of TRPs if the NW wants the UE to serve through multiple TRPs. The MAC CE may comprise a list of TRP for the configuration at the UE's end. Alternately, the UE need not to know all the TRPs but multiple TRPs may send the data to the UE. The NW may also share the TCI state. The UE based on TCI and configuration provided in RRC detects which TRP may serve the UE.

Figure 8:
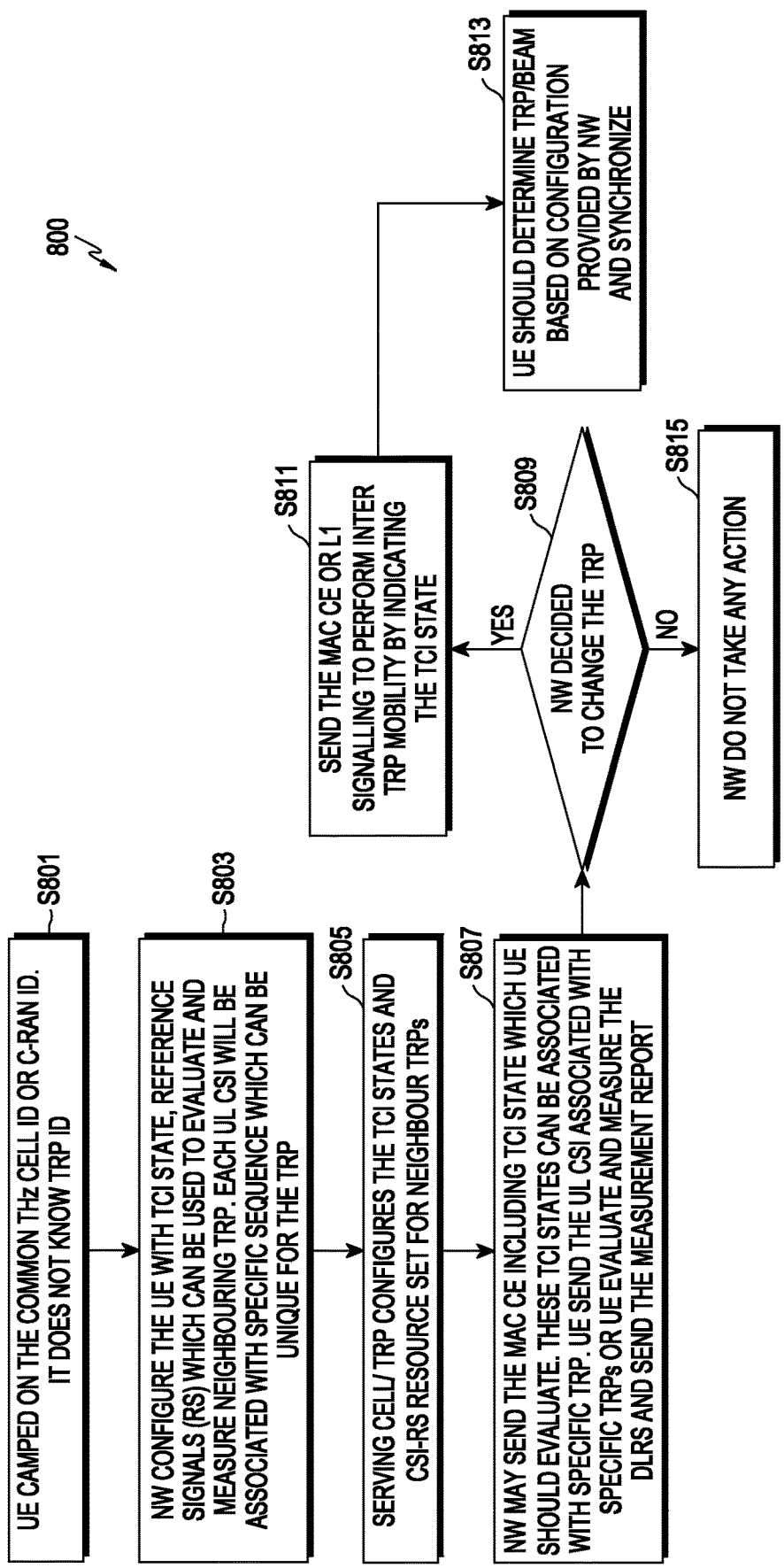
FIG. 8 illustrates the details of procedure for TRP change handover procedure when UE is not aware of TRP ID and only aware of THz cell ID or C-RAN ID—beam level mobility according to an embodiment of the present disclosure.

FIG. 8 illustrates the details of procedure for TRP change handover procedure when a UE is not aware of TRP ID and only aware of THz cell ID or C-RAN ID—beam level mobility, according to an embodiment of the present disclosure. The method 800 may be implemented in the network topology as shown in FIGS. 2A and 2C, where the UE is aware of TRP ID. The method 700 will be described referring to the FIGS. 4, 5, and 6.

At step S801: the UE camped on the common THz cell ID or C-RAN ID. The UE is unaware of the TRP ID.

At step S803: the NW configures the UE with TCI state, CSI-RS or RS related information which may be used to evaluate and measure the neighbouring TRPs. Each UL CSI may be associated with a specific sequence unique to each TRP. As the UE is unaware of any TRPs, the sequence provided in the UL CSI may be used to detect the specific TRP.

At step S805: the serving TRP configures the CSI-RS or any other RS information for neighbor TRPs. Also, serving cell/TRP configures the TCI states for neighbor TRPs. The above information may be used to perform the TRP switching. The UE may be configured with a list of TCI-State configurations, CSI-RS-ResourceMapping, CSI-MeasConfig for beam and TRP measurements through RRC message for the serving cell and other cells or TRPs. The TRP-C controller or any other NW entity may share this information.

At step S807: the NW may send the MAC CE including TCI state which the UE may evaluate. These TCI states may be associated with specific TRP. The MAC CE indicates that these TCI states need to be evaluated. The UE may be able to determine the beams as per existing mechanism and send the measurement report. The UE may also send the UL CSI associated with specific TRPs or UE evaluate and measure the DL RS and send the CSI or TSI or TRP specific measurement report. These reports may be periodic and aperiodic or event triggered. This step is corresponding to step S613 of FIG. 6, and step 403 of FIG. 4.

At step S809: on receiving the reports from the UE, the NW decides whether to perform path switching or not. When the decision at step S809 is yes then step S811 is performed else NW did not take any action as per step 815. The step S809 corresponds to step S615 of FIG. 6 and step 409 of FIG. 4.

At step S811: the NW decides to change the TRP. The NW sends the L1 signaling or MAC CE to switch to the new TRP by indicating the TCI state to the UE. The UE based on the TCI may determine the serving beam. Thus, the need for an RRC signaling message is being avoided. The NW may use any MAC CE formats as defined above as shown in the FIG. 5.

At step S813: The NW sends the L1 signaling or MAC CE with the specific sequence which may be used to detect the TRP. Based on the configuration provided in RRC and TCI state provided in the MAC the UE is capable to detect the TRP. Thereafter, the UE continues decoding with same C-RNTI or any other identifier.

Based on reports provided by the UE, the NW may also take decision to serve the UE with multiple TRPs. Thus, the UE need not to know all the TRPs, but may receive the data from all the TRPs through different antenna ports or RF signals. If the TRPs are not synchronized then NW may send RACH and TA related information.

Once TRP switching or activation/deactivation is completed, if there is change in configuration then the NW may send the RRC message. Ideally, the UE may already have these configurations and can be used during TRP switching or activation/deactivation.

Figure 9:
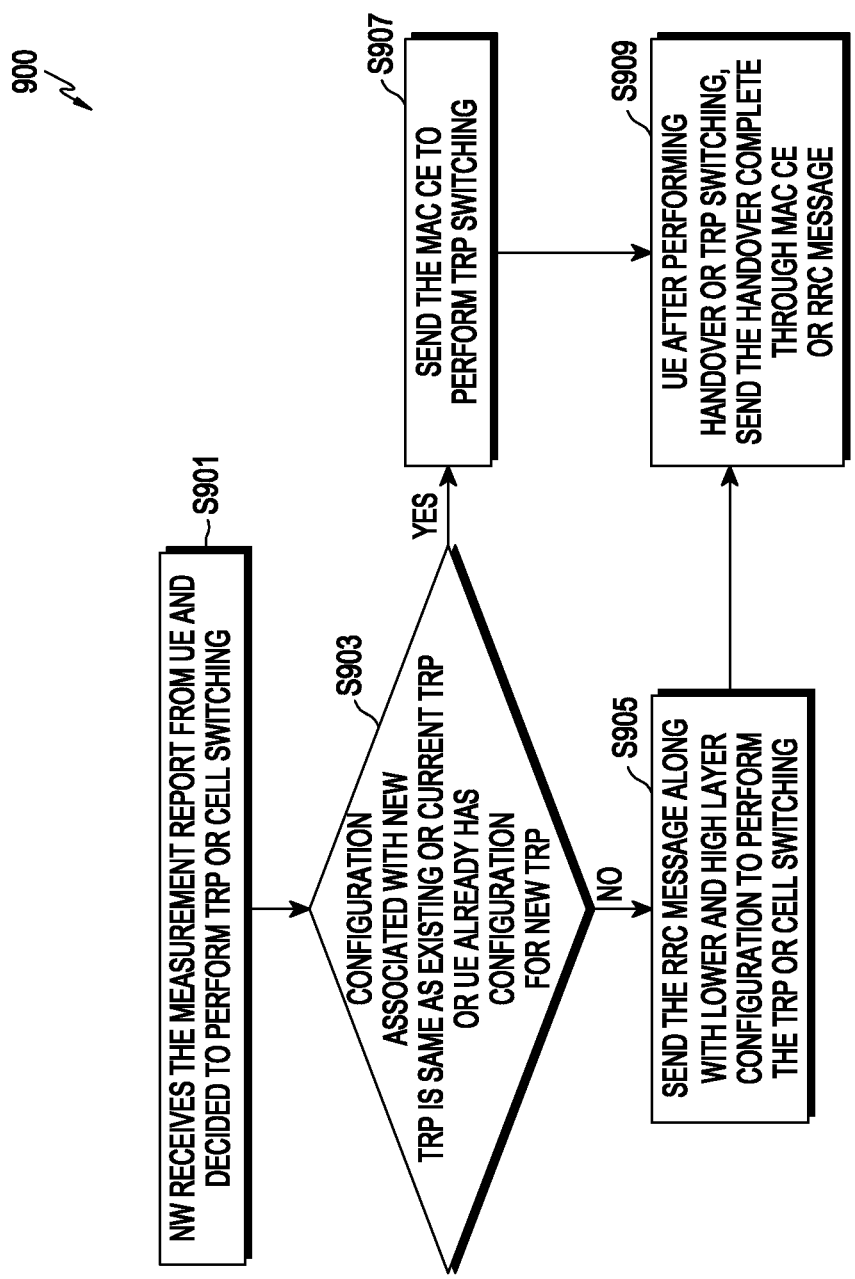
FIG. 9 illustrates details of procedure for network during TRP change when a NW takes decision to either to perform L3 level signalling or L1/L2 level signalling according to an embodiment of the present disclosure.

FIG. 9 illustrates details of procedure for network during TRP change when a NW take decision to either to perform L3 level signalling or L1/L2 level signalling according to an embodiment of the present disclosure. Explanation can be made by referring to the FIGS. 4, 5, and 6.

At step S901: the NW entity receives the measurement report from the UE and decided to perform TRP or cell switching or handover procedure. This step S901 may corresponds to the steps 403, 405 of FIG. 4 and S613 and S615 of the FIG. 6.

At step S903: the NW may determine if the configuration associated with new TRP is same as that of the existing or current TRP or the UE already has configuration for new TRP. In a non-limiting example, the configuration may be related to RRC, PDCP, MAC, RLC or PHY or say security key refresh. If it is determined that there is any change in configuration associated with these layers then the NW can perform step S907. Further, if it is determined that there is no change in configuration associated with these layers then the NW can perform step S905. This step S903 may corresponds to the step 407 of FIG. 4.

At step S905: the NW may send MAC CE or any L1 message to inform the UE about the TRP switching. The MAC CE can comprise TRP ID or cell ID and TCI state. The MAC CE can also comprise BWP ID.

At step S907: the NW may configure the RRC message and send the RRC message to the UE as per conventional system.

At step S909: a UE, after performing handover or TRP switching, sends the handover complete through a MAC CE or an RRC message. The UE may send the RRC message like reconfiguration complete or handover complete. The UE may also send MAC CE as illustrated in FIG. 5 (e.g., (e) as illustrated in FIG. 5) which signifies TRP switching completed and handover procedure complete.

In a further implementation, any of the above steps can be optional. At step 903, a NW can also take decision based on whether TRP ID is changing or cell ID changing. If TRP ID is changing then the NW may send MAC CE message, and if cell ID is changing then the NW may send RRC message or MAC CE. Now, if TRP ID is the same then the NW can simply send the MAC CE for TCI state which need to be activated and may only send RRC or MAC CE when the NW needs to change the cell as per above mentioned procedure. The NW can also share the configuration for the possible TRP set with the NW and ask the UE to activate or deactivate the specific configuration during TRP switching. The same procedure as mentioned above can also be applicable during addition or deletion of the TRPs in active set. These TRPs may support same configuration.

Figure 10:
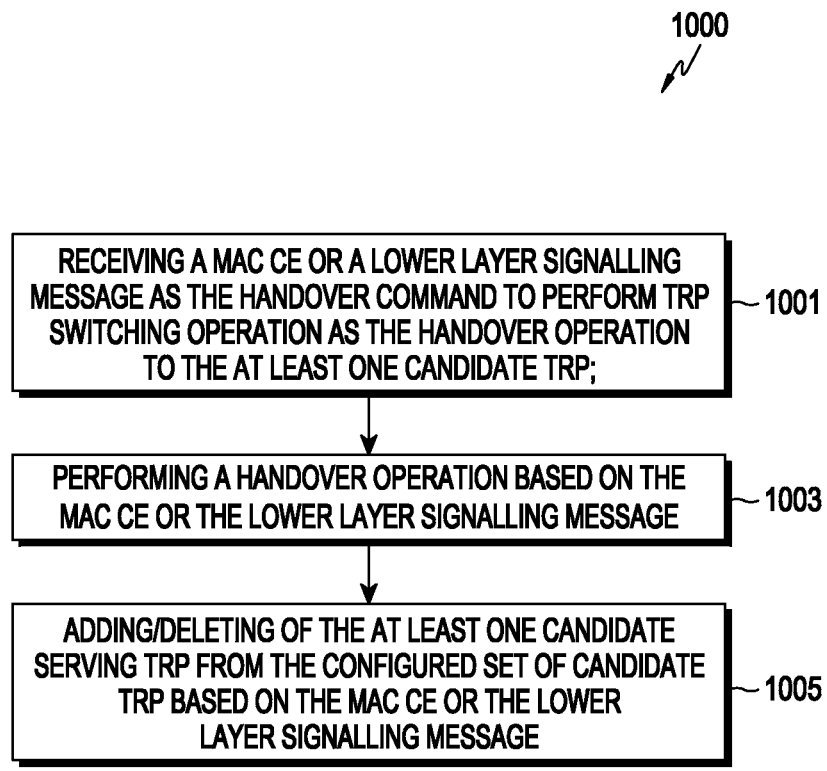
FIG. 10 illustrates a UE procedure when a UE receives a command for MAC CE to perform TRP switching or handover according to an embodiment of the present disclosure.

FIG. 10 illustrates a UE procedure when the UE receives a command for MAC CE to perform TRP switching or handover according to an embodiment of the present disclosure. In an implementation, the method 1000 for a UE behaviour on receiving the TRP change or handover command comprises the following steps.

At step 1001, the UE receives a MAC CE or a lower layer signaling message as the handover command to perform TRP switching operation for the handover operation to the at least one candidate TRP.

Thereafter, at step 1003, the UE performing a handover operation based on the MAC CE or the lower layer signaling message.

Subsequently, to the step 1003 the UE preforms addition/deletion of the at least one candidate serving TRP from the configured set of candidates TRP based on the MAC CE or the lower layer signaling message.

Further to the addition/deletion or modification of the at least one candidate serving TRP from the configured set of candidates TRP, the UE informs a plurality of layers with a new TRP ID or CELL ID associated with the at least one candidate TRP based on data comprised in the MAC CE or the lower layer signaling message. Thereafter, applies configuration associated with the at least one candidate TRP. Further, the UE determines a requirement of a synchronization procedure based on the configuration associated with the at least one candidate TRP, wherein if it is determined that the synchronization procedure is required then perform synchronizing with the at least one candidate TRP. Thus, after completion of the handover message, the UE sends a handover complete message via MAC CE or the lower layer signaling message to the source node after completion of the handover operation.

Figure 11:
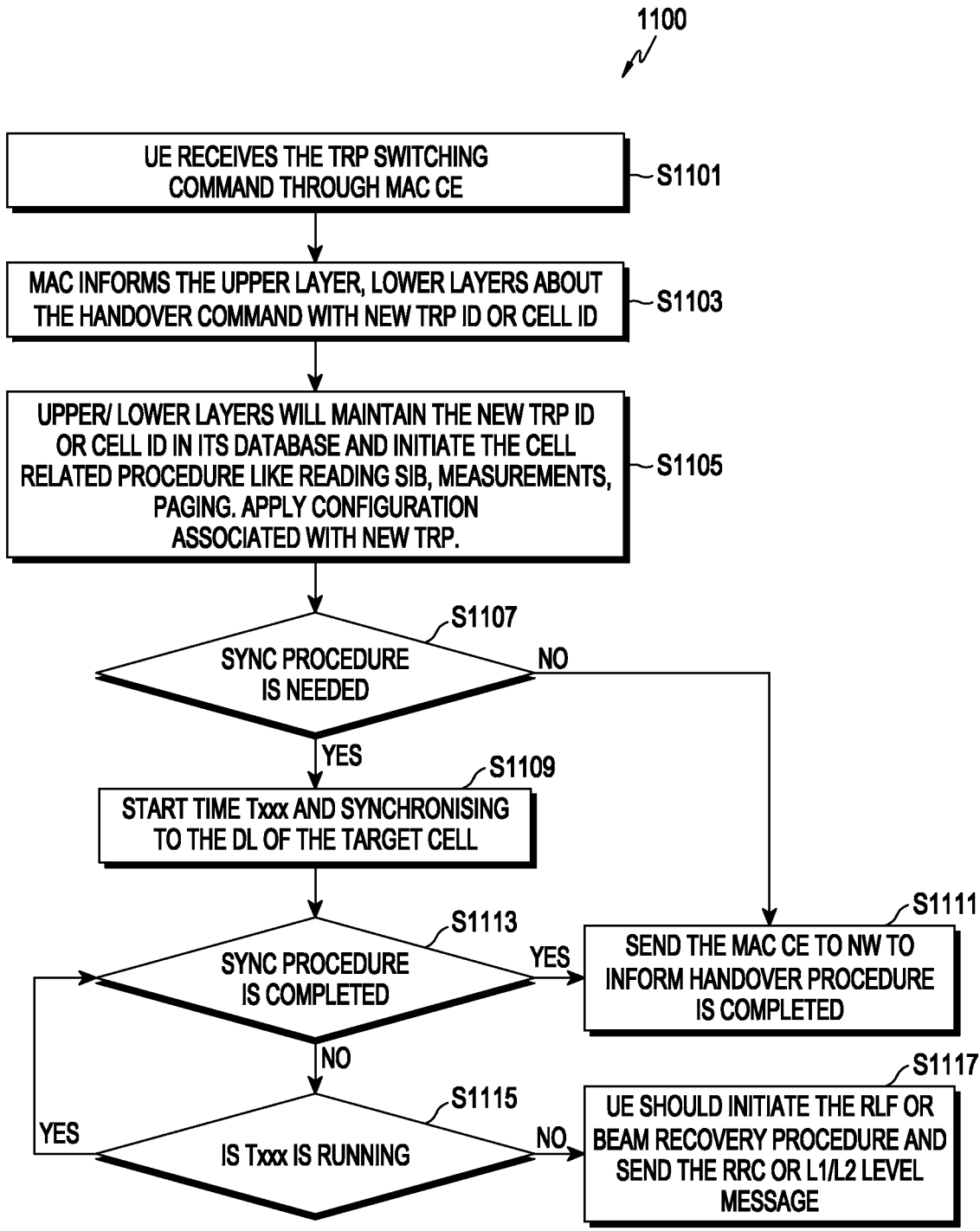
FIG. 11 illustrates a UE procedure when a UE receives the command for MAC CE to perform TRP switching or handover according to an embodiment of the present disclosure.

FIG. 11 illustrates details of a UE procedure when the UE receives the command for MAC CE to perform TRP switching or handover, according to an embodiment of the present disclosure. The explanation of FIG. 11 can be made by referring to the FIG. 10. In an implementation, the method 1100 for a UE behaviour on receiving the TRP change, or handover command comprises the following steps.

At step S1101: the UE receives the TRP switching command through MAC CE which can have TRP ID, TCI state, or the TRP switching command can be activation/deactivation command through which the UE makes out that there is change in cell or TRP ID as described above. The step S1101 corresponds to the step 1001 of the FIG. 10.

At step S1103: the MAC layer informs the upper layers i.e., RRC, PDCP. RLC and lower layers i.e., PHY with the new TRP ID or cell ID and inform about handover command.

At step S1105: upper/lower layers may maintain the new TRP ID or cell ID in the upper/lower layers' database and initiate the cell related procedure like reading SIB, measurements, paging. If there is any configuration associated with this new TRP, then these layers may apply for the configuration and also take appropriate action like MAC reset, PDCP and RLC re-establish if needed. The UE can take these actions if there is change in configuration.

At step 1107: a UE determines whether the synchronizing to the DL of the target cell is needed or not, if yes then go to step S1109 else go to step S1111.

At step S1109: a start timer Txxx for the corresponding TRP or cell with the timer value set to Txxx, as included in the RRC message or stored in RRC.

At step S1111: once the upper layers and lower layers completes the procedure and tuned to new cell, the upper layers and lower layers may detect the PDCCH for the new grant and send the MAC CE which signifies that handover or TRP switching is completed. All layers may send notification to MAC once the procedure is completed. Alternatively, lower layers can indicate the higher layers and RRC can enable or apply the new configuration if needed associated with the TRP set and send TRP switching complete to the NW.

At step S1113: the UE may check if the RACH procedure or any other sync procedure is successfully completed, if the result is yes then step S1111 is performed, else step S1115 is performed.

At step S1115: it is checked whether Timer Txxx is still running, if the result is yes then goes back to perform step 1113 else step 1117 is performed.

At step S1117: once timer Txxx expires, the UE considers that procedure is not completed and release all the new configuration associated with this TRP. The UE takes all actions as defined in the prior art as per TS 38.331. Further, the UE can either initiate the RLF procedure or can also initiate the beam recovery procedure and send the RRC or L1/L2 level message to the NW. This step can also be executed if at step 1111, the UE is not able to detect the PDCCH grant on new TRP.

The UE can perform the existing procedure when the UE receives the MAC CE command or in case that the UE receives the handover command from RRC, and then if there is no change in TRP ID or cell ID then the UE may not perform any MAC reset or PDCP or RLC re-establishment procedure. There is also possibility that if TRP switching is within same cell or across the different cells for which there is no change in central entity or DU or TRP-C then there is no need to take any action on L2 procedures.

All the above-mentioned procedures are also applicable when any Scell become the Pcell or any Pcell become the Scell. Also, when activate/deactivate of change the Pcell or Scells.

Another possible deployment is where multiple TRPs are within a cell or logical entity or TRP-C or central entity that shares the same TRP ID according to an embodiment of the present disclosure. In such type of deployments, there is no need to send the RRC message to perform TRP handover until and unless the UE is moved out of region where TRP ID are different. The UE may still move from one TRP to another TRP through existing mechanism where the NW provides the configuration to the UE. The serving TRP configures the CSI-RS or any other RS information for neighbor TRPs. Also, the serving cell/TRP configures the TCI states for neighbor TRPs. The above information may be used to perform the TRP switching. The UE may be configured with a list of TCI-State configurations, CSI-RS-ResourceMapping, CSI-MeasConfig for beam and TRP measurements through RRC message for the serving cell and other cells or TRPs. The TRP-C controller or any other NW entity may share this information. Once the NW decides to change the TRP, based on L1, L2 or L3 measurements, the NE may share the MAC CE with TCI state. The UE, based on this and configuration, determines the beam which may serve the UE and sync up with the NW.

Thus, to summarize, all the procedure and steps mention in various deployments is possible in any kind of deployment procedure. Table 1 illustrates various phases of the handover procedure.

TABLE 1

Handover procedures with various phases

| Handover Phases | Procedures | Option 1: Different TRP, Same Sync signal | Option 2: Same TRP, Same Sync signal | Option 2: Different TRP, different Sync signal |
|---|---|---|---|---|
| Handover Trigger | Measurement Report | Based on L1 signaling. L1 may monitor the current TRP condition based on DL Reference signal, CSI. | | |
| Handover Preparation | Message exchange b/w source and Target node | There is no need for handover preparation between two nodes until THz cell area change, so core NW signaling during handover may reduce depending on THZ cell range | | |
| Handover execution | TRP change command | A NW may indicate the TRP through L1/L2 signaling. | UE need not to know about it if there is no change in frequency or THz cell ID, no command needed | A NW may indicate the TRP through L1/L2 signaling |
| | RACH procedure | Not needed as TRP are synchronized | Not needed as TRP are synchronized | Needed |

Referring to Table 1 and FIG. 4, various phases of handover procedure are described for various scenarios. For exemplary purposes let us consider a first scenario, in which there are different TRP and same sync signals; a second scenario in which there are same TRP and same Sync signal; and a third scenario in which there are different TRP and different Sync signal. Various phases of handover procedure with respect to each of these scenarios are explained in detail below.

1. During the handover trigger phase, a measurement report procedure is performed at step 2 via L1/L2 signaling. During this phase L1 may monitor the current TRP condition based on DL Reference signal and send the measurement report i.e., UL CSI or any other signal. This procedure is applicable in all the scenarios as consider above.

2. During the handover preparation phase, various messages are exchanged between the source and target node. Further, there is no need for handover preparation between two nodes until THz cell area change; therefore, a core NW signaling during handover may reduce depending on THZ cell range. This procedure is applicable in all the scenarios as consider above.

3. During the handover execution phase, TRP change command procedure is performed at step 3. During this phase, in the first scenario, the NW may indicate the TRP through L1/L2 signaling at step 4 about TRP change. In the second scenario, TRP change command is not needed to be known to the UE as there is no change in frequency or THz cell ID. In the third scenario, the NW may indicate the TRP through L1/L2 signaling at step 4 about TRP change.

Further, during the handover execution phase, the UE synchronizes with the target node and perform the RACH procedure if required. During this phase, in the first scenario and second scenario, the RACH procedure is not needed as TRP is synchronized. In the third scenario, however, the RACH procedure is required to be performed.

The measurements as utilized above may be based on various parameters as below.

Measurements in Idle and Connected mode
    Multiple TRPs may be associated with same frequency or different frequency.
    Measurement based on frequency
        If nearby TRPs of different frequency then the NW may configure measurement. Based on UE measurement, the NW may decide which TRP may serve the UE. If the frequency changes for the TRP then the NW may either indicate the same through L1/L2 signalling or take the conventional approach to perform the TRP switching.
Location based measurements
    The UE may report a location of the UE or Uplink Tracking signal, based on that the NW may decide the TRPs.
    The network determines the UE location (e.g., latitude and longitude) by processing the measurements reported by the UE.

The NW based on location or measurement reports may change the TRP or activate or deactivate specific TRPs. The NW may also configure event based on measurements at L1/L2 level which may be used to send the measurement report at layer 1 level.

Change of TRP within same THz cell ID for handover or Cell reselection is explained below.

The NW based on measurements or load may change the TRP and the UE needs not to know about it if there is no change in frequency or THz cell ID. In this case, the NW may send new C-RNTI and TA (if needed) and TCI state or beam information. Thus, the UE may simply start monitoring the grants based on new C-RNTI.

In case the frequency has changed or THz cell ID change, the NW may indicate the same to the UE. Thereafter, the UE may tune to that frequency or Cell ID. The NW may send new C-RNTI and TA (if needed). Thereafter, the UE may start monitoring the grants based on new C-RNTI. If there is no change in TA then the UE and the NW may support RACH less handover (assuming that TRPs are synchronized). Thus, there is no need of any RACH procedure. Further, there is no impact to any layer, the UE may move to new cell (if new ID) or TRP and start monitoring PDCCH. If there is change in TA then the NW may indicate the UE to perform RACH through signalling or MAC CE or L1 signalling. The MAC CE may also be used to share the TA.

For idle mode cases, there is no need to perform anything until the UE stays in same area i.e., under same TRP controller or central entity. In case of a common cell ID but separate TRP identifier type of deployment the UE may receive the indication of change of TRP through lower layers by means of physical layer and MAC layer control signalling, and RRC is not required to know about it as THz cell ID is same. The NW may send new C-RNTI and TA (if needed), however if there is common identifier then there is no need of it. The UE may simply start monitoring the grants based on new C-RNTI or common identifier. If there is no change in TA then the UE and the NW support RACH less handover (assuming that TRPs are synchronized). Thus, there is no need of any RACH procedure. The UE may move to new cell (if new ID) or TRP and start monitoring PDCCH. If there is change in TA then the NW may indicate the UE to perform RACH through signalling or MAC CE or L1 signalling. The MAC CE may also be used to share the TA. Thus, from the above it can be concluded that due to the aforementioned advanced signalling mechanism overhead due various signalling procedure is reduced and hence higher level of latency, efficiency, and throughput is achieved.

TRP or Cell switching when a UE is configured with Multi TRP or Multi beam system is explained as below.

A UE can be configured with Multi TRP system, which can be during carrier aggregation (CA) or coordinated multi-point kind of system or during multi connectivity system.

In case of CA, a UE includes Pcell and multiple Scells i.e., each cell has been served with specific beam. Currently the UE only reports the measurement for beam, which is for same cell i.e., serving cell, and perform the beam level mobility based on that within serving cell. This can be extended further for inter cell mobility. In this case serving cell or serving TRP configures the CSI-RS or any other RS information for neighbor TRPs also. Also, serving cell/TRP configures the QCL/TCI states for neighbor TRPs. The above information may be used to perform the TRP switching. The UE may be configured with a list of TCI-State configurations, QCL, CSI-RS-ResourceMapping, CSI-MeasConfig for beam and TRP measurements through RRC message for the serving cell and other cells or TRPs. The TRP-C controller or any other NW entity may share this information.

Serving cell can report the measurement for neighbouring beam and if a NW decides to perform the inter cell beam mobility then the NW can send the MAC CE with candidate cell ID and TCI state. This new candidate cell ID can be existing Scell or can be new cell. If the new candidate cell ID is the existing Scell then a UE may make that Scell as primary cell and delete the configuration of Scell and take the necessary action as defined where Scell become Pcell. On receiving the indication at MAC level, the UE may inform the upper layer about inter cell mobility so that RRC can take appropriate actions. The UE can extend the same during beam failure recovery procedure as the UE may be able to perform inter cell beam mobility during beam recovery. This can be applicable for Pcell as well as Scell, but Scell cannot select the beams for Pcell. Both Pcell and Scell can report the beams for neighbour cell beams which includes the existing cell or cells which are configured by the NW. To support the same, the NW may give the configuration which can be used when the NE acts as Pcell as well as Scell. The UE can use the framework for conditional handover where the UE already has configuration and then based on MAC CE indication based the UE can perform the handover or TRP switching and apply the configuration. This decision can be taken based on beam level measurements at L1/L2 level where each cell reports the measurements for neighbour cell also and can perform inter cell beam mobility. When the NW wants to perform the inter cell beam mobility, the NW can indicate the L1/L2 signalling to perform the same and the UE based on existing configuration performs the handover procedure.

There is also possibility when a UE sends inter cell beam measurements at L1/L2 level then a NW L1/l2 layer informs the upper layers and trigger handover mechanism. This may be faster than L3 measurements. Alternatively, on receiving the measurements L1/L2 of a NW send the TCI state along with cell ID to the UE or send MAC CE as defined in this idea. The UE may then take appropriate action as defined in prior art.

The same framework can be extended when a UE is being served through multiple TRPs, in this case if configuration may not change then a NW may perform the handover through L1/L2 signalling. Inter cell beam switching can be further extended for the TRPs which are currently part of Downlink control signaling for non-coherent joint transmission. In this case, the UE may be served through multiple TRPs. There can be single PDCCH from one TRP scheduling PDSCH transmissions from multiple TRPs, and multiple PDCCH with each TRP having one PDCCH transmission scheduling the corresponding PDSCH transmission. The UE may have configuration for all these TRPs. if the NW wants that the NW can perform TRP switching between these configured and active TRPs. The NW can send L1/l2 inter cell beam mobility command and perform the TRP switching. In case configuration changes, then the NW may do at L1/L2 level or with conventional system. The NW can send MAC CE with TRP switching to the UE. The UE may sync with new cell and send the response for the same through RRC message or L1/L2 level as mentioned above.

All the procedures and methods defined above are applicable for any system being cellular or cell less systems.

In view of the aforesaid, there are provided various advantageous features relating to the present disclosure:

Using the present solution, a higher level of latency, efficiency, and throughput are achieved;

Using the present disclosure an overhead occurred due to RRC signaling message is avoided; and Multi TRP per cell or cell less or cell free architecture overcomes the problems faced by the conventional cellular topologies by removing the boundaries of the cell thereby providing a dynamic cellular technology.

Figure 12:
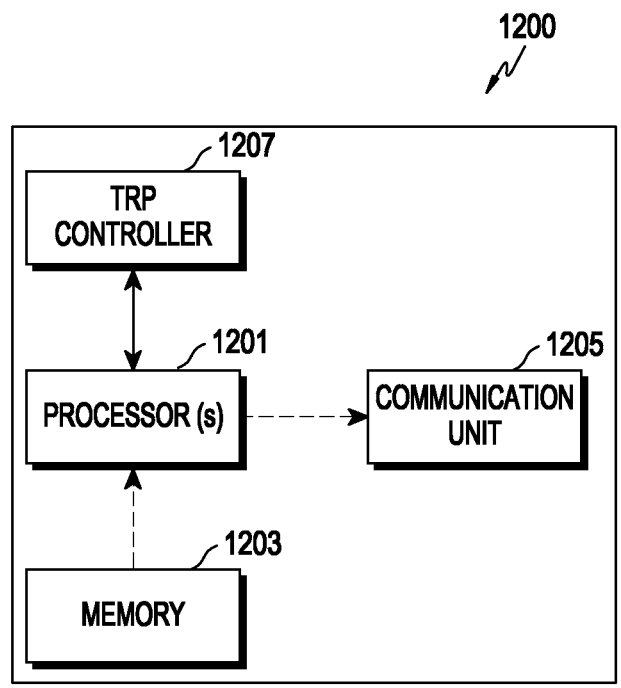
FIG. 12 illustrates another exemplary diagram of a source node according to an embodiment of the present disclosure.

FIG. 12 illustrates another exemplary diagram of a source node. The source node 1200 may include a communication unit 1205 (e.g., communicator or communication interface), memory 1203 (e.g., storage), and a TRP controller 1207 or at least one processor 1201. Further, the source node 1200 may also include the cloud-RAN (C-RAN), a central unit (CU), a core network (NW), a distributed unit (DU) or a TRP controller 1207 or the any other possible NW entity. The various examples of the source node are explained above therefore omitted here for the sake of brevity. The communication unit 1205 may perform functions for transmitting and receiving signals via a wireless channel.

In an example, the processor 1201 may be a single processing unit or a number of units, all of which could include multiple computing units. The processor 1201 may be implemented as one or more microprocessors, microcomputers, microcontrollers, digital signal processors, central processing units, state machines, logic circuitries, and/or any devices that manipulate signals based on operational instructions. Among other capabilities, the processor 1201 is configured to fetch and execute computer-readable instructions and data stored in the memory. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

Figure 13:
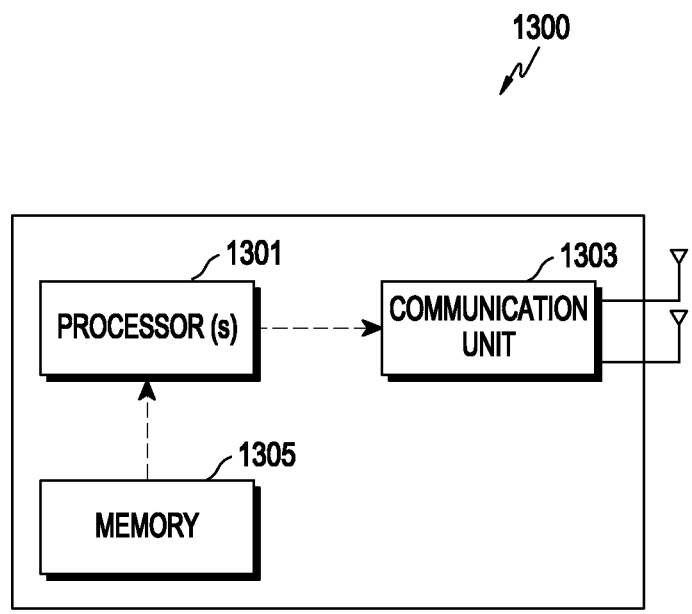
FIG. 13 is a diagram illustrating the configuration of a terminal in a wireless communication system according to an embodiment of the present disclosure.

FIG. 13 is a diagram illustrating the configuration of a terminal 1300 in a wireless communication system according to an embodiment of the present disclosure. The configuration of FIG. 13 may be understood as a part of the configuration of the terminal 1300. Hereinafter, it is understood that terms including "unit" or "er" at the end may refer to the unit for processing at least one function or operation and may be implemented in hardware, software, or a combination of hardware and software.

Referring to FIG. 13, the terminal 1300 may include a communication unit 1303 (e.g., communicator or communication interface), a memory 1305 (e.g., storage), and at least one processor 1301. By way of example, the terminal 1300 may be a User Equipment, such as a cellular phone or other device that communicates over a plurality of cellular networks (such as a 4G, a 5G or pre-5G network or any future wireless communication network).

The communication unit 1303 may perform functions for transmitting and receiving signals via a wireless channel.

The UE or the base station for performing the above operation according to each of the embodiments of FIGS. 1 to 13 (or combinations thereof) may be implemented by including a transceiver for transmitting and/or receiving a signal and a processor controlling the operation of the present invention through the transceiver.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a source node for a handover operation in a wireless communication system, the method comprising:
    selecting a set of candidate transmission/reception points (TRPs) for a user equipment (UE) for the handover operation;
    receiving, from the UE, a measurement report;
    determining a trigger operation for the handover operation of the UE in response to receiving the measurement report;
    comparing a configuration of the source node with a configuration of a candidate TRP from the set of candidate TRPs, wherein comparing the configuration of the source node with the configuration of the candidate TRP comprises comparing configurations of at least one of radio resource control (RRC) layers, packet data convergence protocol (PDCP) layers, medium access control (MAC) layers, radio link control (RLC) layers, or physical layers of the source node and the candidate TRP; and
    triggering a handover command to perform the handover operation for the UE with at least one candidate TRP based on a result of the comparison.

2. The method of claim 1, wherein a layer 2 (L2) level handover is triggered based on the result of the comparison that the configuration of the candidate TRP is similar to the configuration of the source node.

3. The method of claim 1, wherein a layer 3 (L3) level handover is triggered based on the result of the comparison that the configuration of the candidate TRP is different from the configuration of the source node or the result of the comparison that the UE is incompatible with the configuration of the candidate TRP.

4. The method of claim 2, further comprises:
    sending, to the UE, a medium access control control element (MAC CE) or a lower layer signaling message as the handover command to perform a TRP switching operation as the handover operation with the at least one candidate TRP after triggering the L2 level handover.

5. The method of claim 4, wherein the MAC CE or the lower layer signaling message indicates at least one of:
    a TRP identifier (TRP ID) or a cell ID of the at least one candidate TRP; or
    the TRP ID or the cell ID along with a beam index of the at least one candidate TRP.

6. The method of claim 3, further comprising:
    sending a RRC message as the handover command along with configuration information to perform a TRP switching operation as the handover operation with the at least one candidate TRP after triggering the L3 level handover.

7. The method of claim 2, further comprising:
    receiving, from the UE, a handover complete message via a MAC CE or a lower layer signaling message after performing the handover operation at the UE with the at least one candidate TRP.

8. The method of claim 3, further comprising:
    receiving, from the UE, a handover complete message via an RRC message after performing the handover operation at the UE with the at least one candidate TRP.

9. The method of claim 2, further comprising:
    sending, to the UE, a MAC CE or a lower layer signaling message indicating a modification of a configured set of the candidate TRPs comprising a serving TRP set and a candidate TRP set for the UE by addition or deletion of at least one candidate TRP based on a criterion,
    wherein the modification comprises at least one of a modification of the serving TRP set comprised in the configured set of the candidate TRPs, a modification of one or more candidates comprised in the configured set of the candidate TRPs, or a modification of one or more candidate TRPs and serving TRPs comprised in the configured set of the candidate TRPs, and
    wherein the configured set of TRPs is obtained from the selected set of candidate TRPs.

10. An apparatus of a source node for a handover operation in a wireless communication system, the apparatus comprising:
    a transceiver; and
    one or more processors operably connected to the transceiver, the one or more processors configured to:
        select a set of candidate transmission/reception points (TRPs) for a user equipment (UE) for the handover operation;
        receive, from the UE, a measurement report;
        determine a trigger operation for the handover operation of the UE in response to receiving the measurement report;
        compare a configuration of the source node with a configuration of a candidate TRP from the set of candidate TRPs, wherein for comparing the configuration of the source node with the configuration of the candidate TRP, the one or more processors are configured to compare configurations of at least one of radio resource control (RRC) layers, packet data convergence protocol (PDCP) layers, medium access control (MAC) layers, radio link control (RLC) layers, or physical layers of the source node and the candidate TRP; and trigger a handover command to perform the handover operation for the UE with at least one candidate TRP based on a result of the comparison.

11. The apparatus of claim 10, wherein a layer 2 (L2) level handover is triggered based on the result of the comparison that the configuration of the candidate TRP is similar to the configuration of the source node.

12. The apparatus of claim 10, wherein a layer 3 (L3) level handover is triggered based on the result of the comparison that the configuration of the candidate TRP is different from the configuration of the source node or the result of the comparison that the UE is incompatible with the configuration of the candidate TRP.

13. The apparatus of claim 11, wherein the one or more processors is further configured to:
send, to the UE, a medium access control control element (MAC CE) or a lower layer signaling message as the handover command to perform TRP switching operation as the handover operation with the at least one candidate TRP after triggering the L2 level handover.

14. The apparatus of claim 13, wherein the MAC CE or the lower layer signaling message indicates at least one of:
a TRP identifier (ID) or a cell ID of the at least one candidate TRP; or
the TRP ID or the cell ID along with a beam index of the at least one candidate TRP.

15. The apparatus of claim 12, wherein the one or more processors are further configured to:
send a RRC message as the handover command along with configuration information to perform a TRP switching operation as the handover operation with the at least one candidate TRP after triggering the L3 level handover.

16. The apparatus of claim 11, wherein the one or more processors are further configured to:
receive, from the UE, a handover complete message via a MAC CE or a lower layer signaling message after performing the handover operation at the UE with the at least one candidate TRP.

17. The apparatus of claim 10, wherein the one or more processors are further configured to:
receive, from the UE, a handover complete message via an RRC message after performing the handover operation at the UE with the at least one candidate TRP.

18. The apparatus of claim 11, wherein the one or more processors are further configured to:
send, to the UE, a MAC CE or a lower layer signaling message indicating a modification of a configured set of the candidate TRPs comprising a serving TRP set and a candidate TRP set for the UE by addition or deletion of at least one candidate TRP based on a criterion,
wherein the modification comprises at least one of a modification of the serving TRP set comprised in the configured set of the candidate TRPs, a modification of one or more candidates comprised in the configured set of the candidate TRPs, or a modification of one or more candidate TRPs and serving TRPs comprised in the configured set of the candidate TRPs, and
wherein the configured set of TRPs is obtained from the selected set of candidate TRPs.

\* \* \* \* \*